US007061634B1

(12) United States Patent
Ogura et al.

(10) Patent No.: US 7,061,634 B1
(45) Date of Patent: Jun. 13, 2006

(54) SYSTEM AND METHOD FOR SUPERVISING IMAGE FORMING APPARATUSES

(75) Inventors: Masaaki Ogura, Kawasaki (JP); Kiyoshi Ugazin, Yokohama (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/492,456

(22) Filed: Jan. 27, 2000

(30) Foreign Application Priority Data

Jan. 27, 1999 (JP) ................................ 11-019038

(51) Int. Cl.
*G06F 15/00* (2006.01)
*G06K 1/00* (2006.01)

(52) U.S. Cl. ............................ 358/1.15; 399/8; 399/10

(58) Field of Classification Search ...... 358/1.11–1.14, 358/1.15, 1.16, 403, 404, 1.1, 1.9; 399/8, 399/10; 705/28; 395/200, 600, 725
See application file for complete search history.

(56) References Cited

U.S. PATENT DOCUMENTS

| | | | | |
|---|---|---|---|---|
| 5,270,775 | A * | 12/1993 | Suzuki | 399/8 |
| 5,802,271 | A | 9/1998 | Hashimoto et al. | 714/44 |
| 5,887,216 | A * | 3/1999 | Motoyama | 399/8 |
| 5,933,675 | A * | 8/1999 | Sawada et al. | 399/8 |
| 6,088,120 | A * | 7/2000 | Shibusawa et al. | 358/1.15 |
| 6,198,542 | B1 * | 3/2001 | Tabata | 358/1.15 |
| 6,208,428 | B1 * | 3/2001 | Chihara et al. | 358/1.15 |
| 6,216,113 | B1 * | 4/2001 | Aikens et al. | 705/34 |
| 6,507,409 | B1 * | 1/2003 | Kawaguchi | 358/1.16 |

FOREIGN PATENT DOCUMENTS

| | | |
|---|---|---|
| JP | 6-131278 | 5/1994 |
| JP | 7-325515 | 12/1995 |

OTHER PUBLICATIONS

U.S. Appl. No. 09/492,456, filed Jan. 27, 2000, Ogura et al.
U.S. Appl. No. 10/668,007, filed Sep. 23, 2003, Ogura.

* cited by examiner

*Primary Examiner*—Gabriel Garcia
*Assistant Examiner*—Thierry L. Pham
(74) *Attorney, Agent, or Firm*—Oblon, Spivak, McClelland, Maier & Neustadt, P.C.

(57) ABSTRACT

An image forming apparatus and method supervising system includes a plurality of data communication apparatuses connecting at least one image forming apparatuses and a central control apparatus through a plurality of data communication apparatuses via a communication line. The image forming apparatus supervising system supervises the image forming apparatuses with the central control apparatus via the communication line and the data communication apparatus. A usage information transmitting device transmits usage information such as for example the total number of image formed sheets to the central control apparatus. An apparatus list generating device generates an apparatus list indicating which image forming apparatuses or data communication apparatuses have usage information to be transmitted. A first obtaining operation executing device obtains the usage information. A confirming device confirms at least one data communication or image forming apparatus with not-yet-obtained usage information. A not-yet-obtained list generating device generates a not-yet-obtained list indicating that at least one data communication and image forming apparatus has not-yet-obtained usage information. Further, a second obtaining operation executing device obtains usage information from those apparatuses having not-yet-obtained usage information (i.e usage information which did not transmit usage data during the first obtaining operation).

14 Claims, 37 Drawing Sheets

Fig. 10

| Code | Operation Name | Operation Contents |
|---|---|---|
| 30 | SC Call | Auto Report When SC occurs |
| 31 | Manual Call | Auto Report When Manual Switch is depressed |
| 32 | Alarm Transmission | Auto Report When Alarm occurs |
| 22 | Block billing operation | Auto Report of reaching Block Billing Number of Sheet |
| 02 | Data Read | Read inside Data of PPC |
| 04 | Data Write | Rewrite Inside Data of PPC |
| 03 | Execute | Remotely Execute Test etc |
| 08 | Device Code Confirming operation | Operation for Checking Communication Function |

Fig. 11

| Code | Data length | Contents |
|---|---|---|
| Information Code | 11 | Code indicating specific Information kind |
| Data Section Digit | 2 | Data length of following Data Section.<br>Represent using ASCII Code.<br>00 When no Data Section. |
| Data Section | Changeable length | Data of contents of each Information code.<br>No Field when Data Section Digit Number is 00. |

Fig. 21

| SEQ | Customer Name | Model | Machine Number | Inform -ation Kind | Recep -tion time | Arrang -ing Time | Condition | Person in charge | Color Infor -mation | Elapsing Time | Customer Information | Service Information | Others |
|---|---|---|---|---|---|---|---|---|---|---|---|---|---|
| 511 | FFF Precision | FFF | FF01 | 200 | 11:50 | 11:50 | In Process of Arrangement | Tanaka | Red | 3:00 | | Company A | |
| 512 | EEE Commercial firm | EEE | EE01 | 500 | 12:10 | 12:10 | In Process of Arrangement | Okada | Blue | 0:30 | Major Company | Company B | |
| 513 | DDD Electric | DDD | DD01 | 300 | 12:30 | 12:33 | In Process of Arrangement | Yoshida | Green | 0:30 | | Company A | |
| 514 | CCC Machine | CCC | CC01 | 100 | 12:48 | | In Process of Operation | Okada | Green | 0:10 | Lawyer | Company C | |
| 515 | BBB Construction | BBB | BB01 | 200 | 12:50 | | In Process of Operation | Tanaka | Green | 0:05 | | Company A | |
| 516 | AAA Trading Company | AAA | AA01 | 100 | 13:00 | | | | Green | 0:00 | | Company D | |
| 517 | | | | | | | | | | | | | |
| 518 | | | | | | | | | | | | | |
| 519 | | | | | | | | | | | | | |

Fig. 22

| SEQ | Customer Name | Telephone Number | Fax Number | Address | Place | Person in charge | Deliv-ery Date | Deliv-ered Machine | Machine Number | Service Company | Telephone Number | Fax | Others |
|---|---|---|---|---|---|---|---|---|---|---|---|---|---|
| 001 | AAA Trading Company | 03-1234-5678 | 03-1234-5679 | Shinba shi, Minato-ku | Import Section | AAA | 96/1/10 | AAAA | AA01 | ABC Service | 03-5234-5678 | 03-5234-5679 | Emergency level High |
| 002 | BBB Const-ruction | 03-2234-5678 | 03-2234-5679 | Shinba shi, Minato-ku | Import Section | BBB | 97/1/10 | BBBB | BB01 | ABC Service | 03-5234-5678 | 03-5234-5679 | |
| 003 | CCC Machine | 03-3234-5678 | 03-3234-5679 | Shinba shi, Minato-ku | Import Section | CCC | 97/1/22 | AAAA | AA02 | ABC Service | 03-5234-5678 | 03-5234-5679 | Bad Relation |
| 004 | DDD Electric | 03-4234-5678 | 03-4234-5679 | Shinba shi, Minato-ku | Import Section | DDD | 96/10/10 | CCCC | CC01 | DEF Service | 03-9234-5678 | 03-9234-5679 | Emergency level High |
| 005 | EEE Commercial Firm | 03-7234-5678 | 03-7234-5679 | Shinba shi, Minato-ku | Import Section | EEE | 96/9/10 | AAAA | AA03 | DEF Service | 03-9234-5678 | 03-9234-5679 | |
| 006 | FFF Precision | 03-6234-5678 | 03-6234-5679 | Shinba shi, Minato-ku | Import Section | FFF | 97/1/10 | DDDD | DD01 | ABC Service | 03-5234-5678 | 03-5234-5679 | Good Relation |
| 007 | | | | | | | | | | | | | |
| 008 | | | | | | | | | | | | | |
| 009 | | | | | | | | | | | | | |

Fig. 23

| SEQ | Delivered Machine | Machine Number | Delivery Date | Machine Construction | Problem Career | Repair Career | Machine Information | Design Information | Others |
|---|---|---|---|---|---|---|---|---|---|
| 001 | AAAA | FF01 | 96/1/10 | 112340 | 97/10/1 Fixing Section JAM | 97/102 Sensor was Replaced | TL:12300,JAM:20 | | |
| 002 | BBBB | EE01 | 97/1/10 | 120000 | | | TL:12400,JAM:40 | 97/5/1 Designed around 1 | |
| 003 | AAAA | DD01 | 97/1/22 | 112000 | | | TL:33300,JAM:10 | | |
| 004 | CCCC | CC01 | 96/10/10 | 120000 | | | TL:1240,JAM:20 | | |
| 005 | AAAA | BB01 | 96/9/10 | 112340 | 97/10 SC200 | 97/10/2 Fixing Roller was Replaced SC200 | TL:22300,JAM:40 | | |
| 006 | DDDD | AA01 | 97/1/10 | 100000 | | | TL:1230,JAM:5 | 97/5/1 Designed around 2 | |
| 007 | | | | | | | | | |
| 008 | | | | | | | | | |
| 009 | | | | | | | | | |

Fig. 24

| SEQ | Delivered Machine | Machine Number | Information Receiving Date | Item of Information | Information generating Date | Machine Information (Counter Information) | Machine Information (Setting Information) | Other Information |
|---|---|---|---|---|---|---|---|---|
| 001 | AAAA | AA01 | 96/1/10 10:20 | Fixing Section | 97/10/1 10:10 | TL:12300,JAM:20 | Fixing Temperature; 180, Drum Current; 10 | ROMVer.1.02 |
| 002 | AAAA | AA03 | 97/1/10 20:10 | SC200 | 97/1/10 20:00 | TL:12400,JAM:40 | Fixing Temperature; 182, Drum Current; 11 | ROMVer.1.04 |
| 003 | CCCC | CC01 | 97/9/22 01:10 | JAM Alarm | 97/9/21 09:10 | TL:33300,JAM:10 | Fixing Temperature; 178, Drum Current; 9 | ROMVer.1.12 |
| 004 | DDDD | DD01 | 96/9/25 15:20 | SC400 | 96/9/25 15:10 | TL:1240,JAM:20 | Fixing Temperature; 185, Drum Current; 15 | ROMVer.2.02 |
| 005 | | | | | | | | |
| 006 | | | | | | | | |
| 007 | | | | | | | | |
| 008 | | | | | | | | |
| 009 | | | | | | | | |

Fig. 26

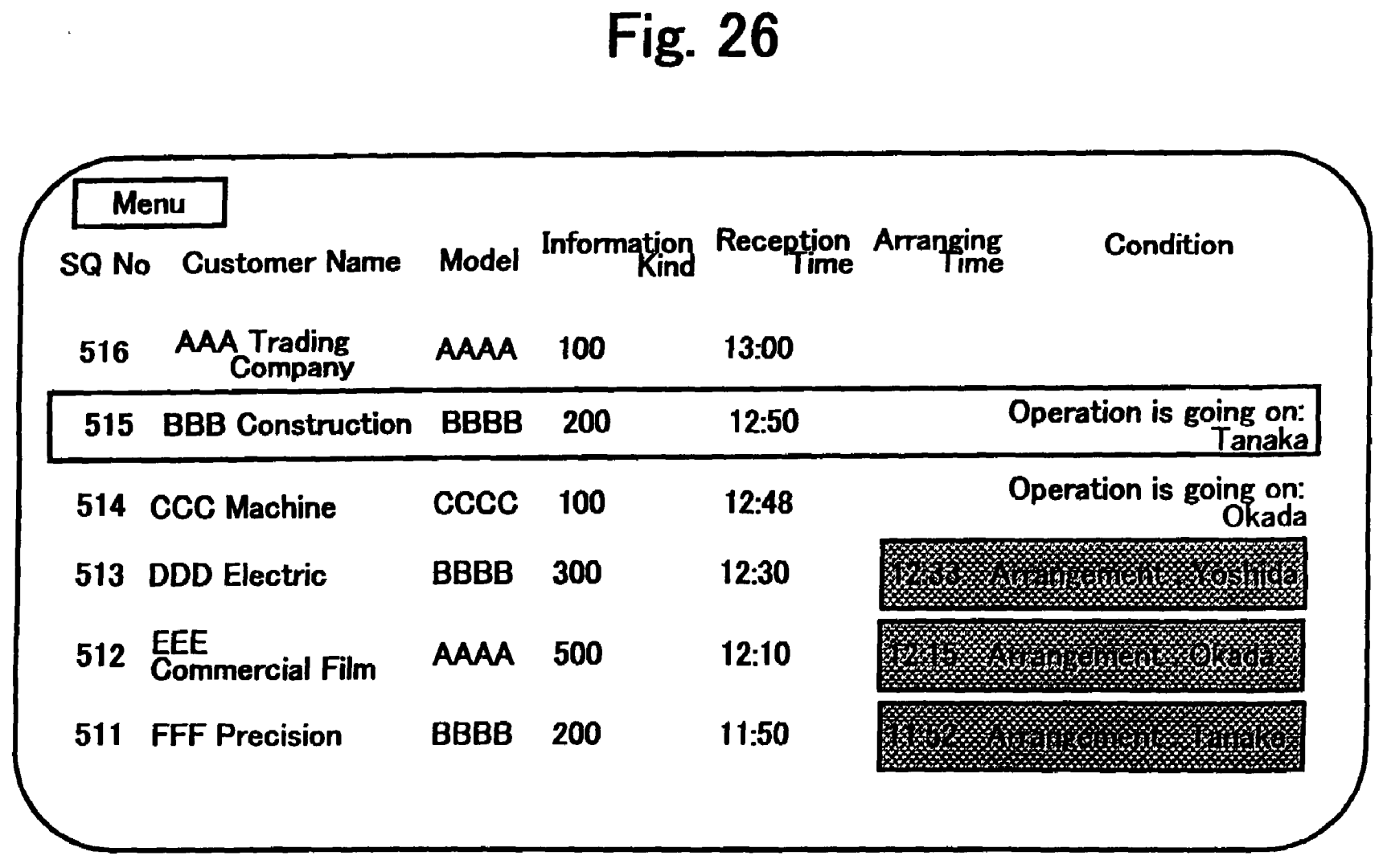

Menu

| SQ No | Customer Name | Model | Information Kind | Reception Time | Arranging Time | Condition |
|---|---|---|---|---|---|---|
| 516 | AAA Trading Company | AAAA | 100 | 13:00 | | |
| 515 | BBB Construction | BBBB | 200 | 12:50 | | Operation is going on: Tanaka |
| 514 | CCC Machine | CCCC | 100 | 12:48 | | Operation is going on: Okada |
| 513 | DDD Electric | BBBB | 300 | 12:30 | 12:33 | Arrangement : Yoshida |
| 512 | EEE Commercial Film | AAAA | 500 | 12:10 | 12:15 | Arrangement : Okada |
| 511 | FFF Precision | BBBB | 200 | 11:50 | 11:52 | Arrangement : Tanaka |

Fig. 31

| | | | | | | | | | | | |
|---|---|---|---|---|---|---|---|---|---|---|---|
| SYN | SOH | Serial Number | Model machine Number | Detected Date/Time | Code of Counter Value Confirming Call | Total copy sheet Number 1 | Total copy sheet Number 2 | Total copy sheet Number 3 | Total copy sheet Number n | ETX or ETB | LRC |

FIG. 34

Setting Amount for Model

| No | Item | Setting Amount | Note |
|---|---|---|---|
| 1 | Model Machine Number | REEE-EE01 | |
| 2 | Total Copy sheet Number 1 | 123456 Sheets | |
| 3 | Total Copy sheet Number 2 | 1500 Sheets | |
| 4 | Total Copy sheet Number 3 | 3000 Sheets | |
| 5 | Total Copy sheet Number n | 1000 Sheets | |
| 6 | Total Copy sheet Number 1 Last Month | 110456 Sheets | |
| 7 | Total Copy sheet Number 2 Last Month | 1000 Sheets | |
| 8 | Total Copy sheet Number 3 Last Month | 2000 Sheets | |
| 9 | Total Copy sheet Number n Last Month | 800 Sheets | |
| 10 | Total Copy sheet Number 1 Average Value | 13000 Sheets | |
| 11 | Total Copy sheet Number 2 Average Value | 500 Sheets | |
| 12 | Total Copy sheet Number 3 Average Value | 1000 Sheets | |
| 13 | Total Copy sheet Number n Average Value | 200 Sheets | |

FIG. 35

1. All Counter Values confirmation List

| No | Model | Machine Number | Closing day | Existence of self Call generation |
|---|---|---|---|---|
| 1 | FFF | FF01 | 5 | Self Call generation |
| 2 | EEE | EE01 | 15 | Self Call generation |
| 3 | DDD | DD01 | 15 | Self Call generation |
| 4 | CCC | CC01 | 5 | Self Call generation |
| 5 | BBB | BB01 | 20 | Self Call generation |
| 6 | AAA | AA01 | 15 | Self Call generation |
| | : | : | : | : |
| n | AAA | AA01 | 15 | Call up |

2. Counter value for 15th Confirmation List

| No | Model | Machine Number | Closing day | Existence of self Call generation |
|---|---|---|---|---|
| 1 | EEE | EE01 | 15 | Self Call generation |
| 2 | DDD | DD01 | 15 | Self Call generation |
| 3 | AAA | AA01 | 15 | Self Call generation |
| | : | : | : | : |
| n | AAA | AA01 | 15 | Call up |

Fig. 36

1. Counter Value Confirmation Obtained List for 15th

| No | Model | Machine Number | Closing day | Obtaining Time | Abnormal Condition | Call generating form | Number of Trying Times | Number of Total Copy Sheets 1 | Number of Total Copy Sheets 2 | Number of Total Copy Sheets 3 | Number of Total Copy Sheets n |
|---|---|---|---|---|---|---|---|---|---|---|---|
| 1 | EEE | EE01 | 15 | 10:20 | Normal | Self Call Generation | 1 | 123456 | 1500 | 3000 | 1000 |
| 2 | DDD | DD01 | 15 | 10:30 | Normal | Self Call Generation | 1 | 120056 | 5000 | 6500 | 2000 |
| 3 | AAA | AA01 | 15 | | | Self Call Generation | 1 | | | | |
| 4 | AAA | AA02 | 15 | | | | | | | | |
| 5 | AAB | AA03 | 15 | | | | | | | | |
| | : | : | : | | | | | | | | |
| n | AAA | AA02 | 15 | | No Response from other end of line | Call up | 2 | | | | |

2. Counter value Confirmation obtained List for 15th after obtaining again

| No | Model | Machine Number | Closing day | Obtaining Time | Abnorma-lity Condition | Call generating form | Number of Trying Times | Number of Total Copy Sheets 1 | Number of Total Copy Sheets 2 | Number of Total Copy Sheets 3 | Number of Total Copy Sheets n |
|---|---|---|---|---|---|---|---|---|---|---|---|
| 1 | EEE | EE01 | 15 | 10:20 | Normal | Self Call Generation | 1 | 123456 | 1500 | 3000 | 1000 |
| 2 | DDD | DD01 | 15 | 10:30 | Normal | Self Call Generation | 1 | 120056 | 5000 | 6500 | 2000 |
| 3 | AAA | AA01 | 15 | 12:10 | Normal | Self Call Generation | 1 | 120156 | 7000 | 5500 | 9000 |
| 4 | AAA | AA02 | 15 | 11:10 | Normal | Call up | 2 | 130056 | 8000 | 9500 | 5000 |
| 5 | AAB | AA03 | 15 | | BUSY | Call up | 2 | | | | |
| | : | : | : | | | | | | | | |
| n | AAA | AA02 | 15 | | No Response | Call up | 2 | | | | |

Fig. 37

1. Counter Value Confirmation Not yet Obtained List for 15th

| No | Model | Machine Number | Closing day | Obtaining Time | Abnormal Condition | Call generating form | Number of Trying Times | Number of Total Copy Sheets 1 | Number of Total Copy Sheets 2 | Number of Total Copy Sheets 3 | Number of Total Copy Sheets n |
|---|---|---|---|---|---|---|---|---|---|---|---|
| 1 | AAB | AA03 | 15 | 10:20 | BUSY | Call up | 2 | | | | |
| | : | : | : | | | | | | | | |
| n | AAA | AA02 | 15 | | No Response | Call up | 2 | | | | |

SYSTEM AND METHOD FOR SUPERVISING IMAGE FORMING APPARATUSES

CROSS REFERENCE TO RELATED APPLICATIONS

This application claims benefit of priority under 35 U.S.C. §119 Japanese Patent Application No. 11-19038 filed on Jan. 27, 1999, the entire contents of which are incorporated by reference herein.

BACKGROUND OF THE INVENTION

1. Field of the Invention

The present invention generally relates to an image-forming apparatus supervising system which includes a plurality of data communication apparatuses each connecting with one or more image-forming apparatuses, such as copiers and printers, and a central control apparatus (herein after referred to as a center system) connecting with the plurality of data communication apparatuses via a communication line.

2. Discussion of the Background

An image-forming apparatus supervising system, a system capable of connecting a plurality of image-forming apparatuses (i.e., copiers or the like which include a remote diagnosis) disposed at an office or the like with unspecified users (i.e., customers) to a center system disposed at sales or service bases (i.e., company) or the like, using a data communication apparatus and a communication line such as for example a public line, is generally known.

In such an image-forming apparatus supervising system, the center system subsequently executes an obtaining (i.e., a collecting) operation for obtaining usage information, such as a total copy count value of an applicable image-forming apparatus, which is transmitted from each communication apparatus when a self-generating call is made by the data communication apparatus or when the center system gets access thereto on a predetermined closing day (e.g., $5^{th}$ day of every month). The center system then automatically submits a bill corresponding to the usage information obtained.

In such a conventional image-forming apparatus supervising system, it is unsure whether the center system correctly obtains usage information of all image-forming apparatuses (i.e, all the image-forming apparatuses connected via the communication line and each data communication apparatus) by circumstances occurring in the image-forming apparatus, the data communication apparatus, and the communication line such as for example as indicated in the following items (1) through (5):

(1) A problem occurs in the line;

(2) A line is disconnected because of moving of a customer;

(3) Communication is interrupted during transmission of usage information by the data communication apparatus because a facsimile (FAX) or a telephone connected to the data communication apparatus is utilized;

(4) The data communication apparatus could not transmit usage information because of a busy state (BUSY) of the center system side; or (5) The center system could not get access to the data communication apparatus because the FAX or telephone connected to the data communication apparatus is utilized.

Then, in the above noted conventional image-forming apparatus supervising system when the center system could not correctly obtain the usage information of all the applicable image-forming apparatuses, the above-noted obtaining operation is executed again several times. Thus, there exists at times a case in which usage information of all applicable image-forming apparatuses is not correctly obtained.

SUMMARY OF THE INVENTION

Accordingly, an object of the present invention is to address and resolve such problems and provide a novel image-forming apparatus supervising system including a plurality of data communication apparatuses each connecting with one or more image-forming apparatuses, a central control apparatus connecting with each data communication apparatus via a communication line, and remotely supervising each image-forming apparatus with the central control apparatus via both the communication line and each data communication apparatus.

A usage information transmitting device is provided in each data communication apparatus and transmits usage information to the central control apparatus such as for example a total number of image formed sheets of an applicable image-forming apparatus, either when generating a self call or when accessed by the central control apparatus. The usage information can be sent periodically to the central control apparatus at regular intervals or at intervals set by the discretion of an end user. An apparatus list-generating device is provided in the central control apparatus and generates an apparatus list indicating each image-forming apparatus or each data communication apparatuses having usage information to be transmitted.

A first obtaining operation device is provided in the central control apparatus and executes a first obtaining operation by subsequently obtaining usage information of an image-forming apparatus, which is transmitted from the data communication apparatus either when the data communication apparatus generates a self-call or when accessed by the central control apparatus, after the apparatus list is generated. A confirming device is provided in the central control apparatus and confirms one or more data communication devices or image-forming apparatuses having not-yet-obtained usage information by checking the result of the first obtaining operation with the apparatus list after the first obtaining operation is executed. A not-yet-obtained list generating device is provided in the central control apparatus and generates a not-yet-obtained list indicating the effect that one or more data communication devices or image-forming apparatuses has usage information not-yet-obtained (i.e., not-yet-obtained usage information).

Further, a second obtaining operation device is provided in the central control apparatus and obtains usage information from one or more image-forming apparatuses having not-yet-obtained usage information or from one or more data communication apparatuses connected to one or more image-forming apparatuses having not-yet-obtained usage information by accessing thereof based on the not-yet-obtained list.

In another embodiment, a not-yet-obtained usage information second confirming device is employed to check a result of an obtaining operation executed by a second obtaining operation device with the not-yet-obtained list and confirms one or more data communication apparatuses or image-forming apparatuses having not-yet-obtained usage information after execution of the second obtaining operation, and a not-yet-obtained information list regenerating device is employed to regenerate an updated not-yet-obtaining information list indicating one or more data communication apparatuses or image-forming apparatuses having not-yet-obtained usage information which is confirmed by a second obtaining operation after execution of the second obtaining operation. A second obtaining operation device executes a second obtaining operation again after a predetermined time has elapsed, if one or more data communication apparatuses or image-forming apparatuses having not-yet-obtained usage information are confirmed by the second obtaining operation after execution of the second obtaining operation.

In yet another embodiment, a usage information obtaining impossible-list generating device is employed to generate a usage information obtaining impossible-list indicating one or more data communication apparatuses or image-forming apparatuses having not-yet-obtained usage information, when one or more data communication apparatuses or image-forming apparatuses having not-yet-obtained usage information are confirmed even if a predetermined number of times of the second obtaining operations have been executed by the second obtaining operation device.

BRIEF DESCRIPTION OF THE DRAWINGS

A more complete appreciation of the present invention and many of the attendant advantages thereof will be readily obtained as the same becomes better understood by the following detailed description when considered in connection with the accompanying drawings, wherein:

FIG. 10 is a chart illustrating an exemplary constitution of text data communicated between the data communication apparatus 7 and a P/I of image-forming apparatuses 1 through 5;

FIG. 11 is also a chart illustrating an exemplary constitution of text data communicated between the P/I of image-forming apparatuses 1 through 5 and a PPC controller;

FIG. 21 is a chart illustrating a database;

FIG. 22 is a chart illustrating another database;

FIG. 23 is a chart illustrating another data base;

FIG. 24 is a chart illustrating another data base;

FIG. 26 is a block chart illustrating the first example of a reception screen (auto report information screen) displayed on a displaying apparatus illustrated in FIG. 4;

FIG. 29 is a block chart illustrating another example of subwindow or the like;

FIG. 30 is a block chart illustrating another example of a subwindow or the like;

FIG. 31 is a chart illustrating a summary and exemplary constitution of text data transmitted from each data communication apparatus 7 to the center system 6 illustrated in FIG. 1 according to the present invention;

FIG. 34 is a chart illustrating one example of supervising information including each total copy sheet number (total counter value) of one unit of an image-forming apparatus, which is stored in the data file 122 illustrated in FIG. 18;

FIG. 35 is a chart illustrating one example of an all counter value confirming list and a counter value confirmed list for fifteenth;

FIG. 36 is a chart illustrating an example of a counter value confirmed and obtained list for the fifteenth (i.e., a closing day) and an example of a counter value confirmed list made re-obtained for the fifteenth again, and respectively stored in the data file 122 illustrated in FIG. 18; and FIG. 37 is a chart illustrating one example of a counter value confirmed and a not-yet-obtained list for the fifteenth, stored in the data file 122 illustrated in FIG. 18.

DESCRIPTION OF THE PREFERRED EMBODIMENTS

Figure 1:
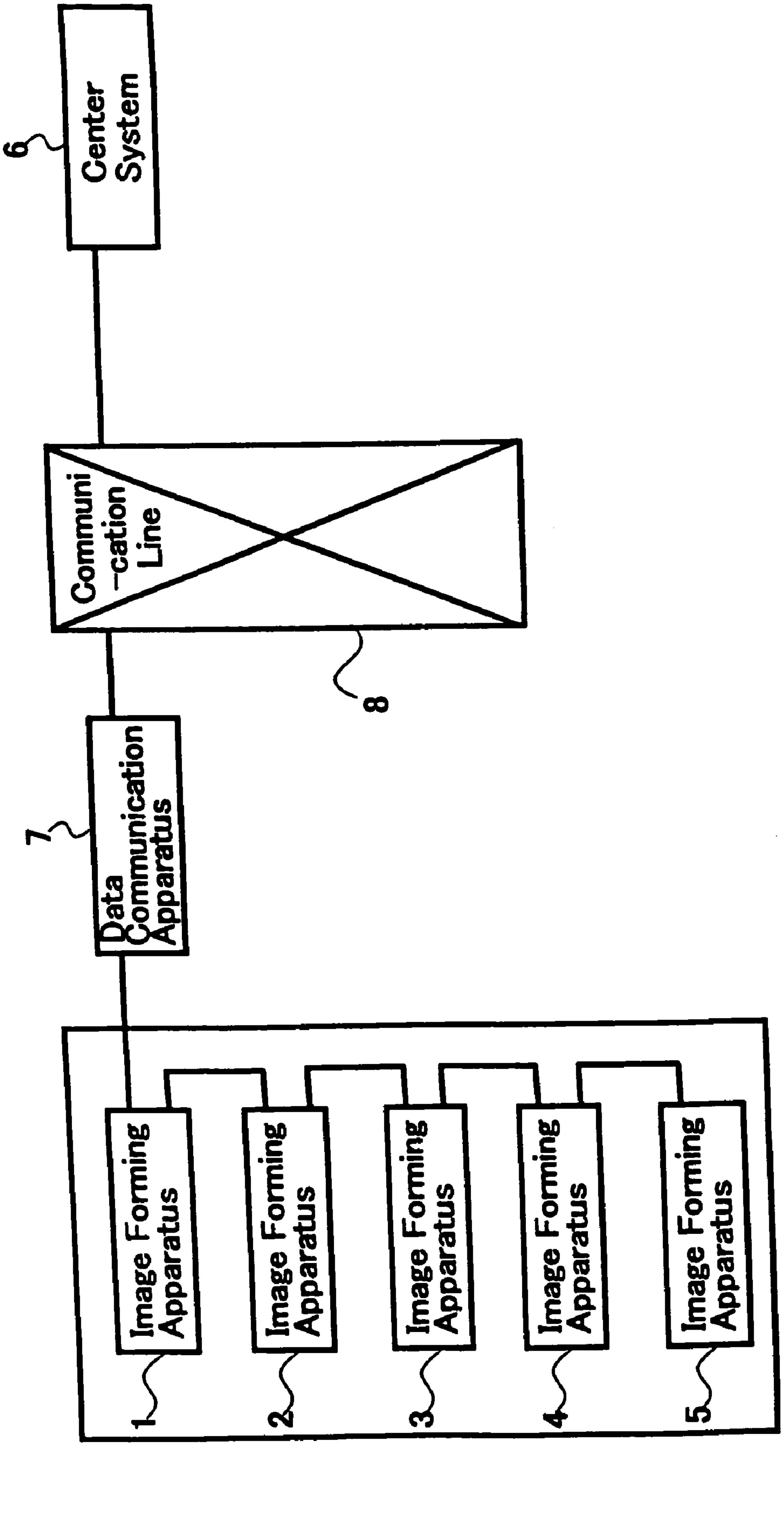
FIG. 1 is a block diagram illustrating an exemplary constitution of one example of an image apparatus supervising system according to the present invention.

Referring now to the drawings, wherein the reference numerals designate identical or corresponding parts throughout several views, and more particularly to FIG. 1 thereof, an exemplary constitution of one example of an image-forming apparatus supervising system of the present invention.

The image-forming apparatus supervising system may contain five units of an image-forming apparatus (a copier or the like) 1 through 5 which assumes a remote diagnosis and a center system 6 connected to the five units via a data communication apparatus 7 and a communication line 8 and may be enabled to remotely supervise each of five units of an image-forming apparatus using the center system 6. The data communication apparatus 7 may selectively transfer instruction signals to the image-forming apparatuses 1 through 5 and transmits (i.e., reports) a variety of information to the center system 6 from the image-forming apparatuses 1 through 5 via the communications line 8. The data communication apparatus 7 may be supplied with an electrical power source all day and enables communication to be executed between the center system 6 and the image-forming apparatuses 1 through 5 even during night time when the electrical power source of the image-forming apparatuses 1 through 5 is turned off. Each of the image-forming apparatuses 1 through 5 and the data communication apparatus 7 are connected with each other in a state of a multi-drop connection according to a serial communication interface standard RS-485. Communication between the image-forming apparatuses 1 through 5 and the data communication apparatus 7 may be executed by polling and selecting from the data communication apparatus 7.

Figure 2:
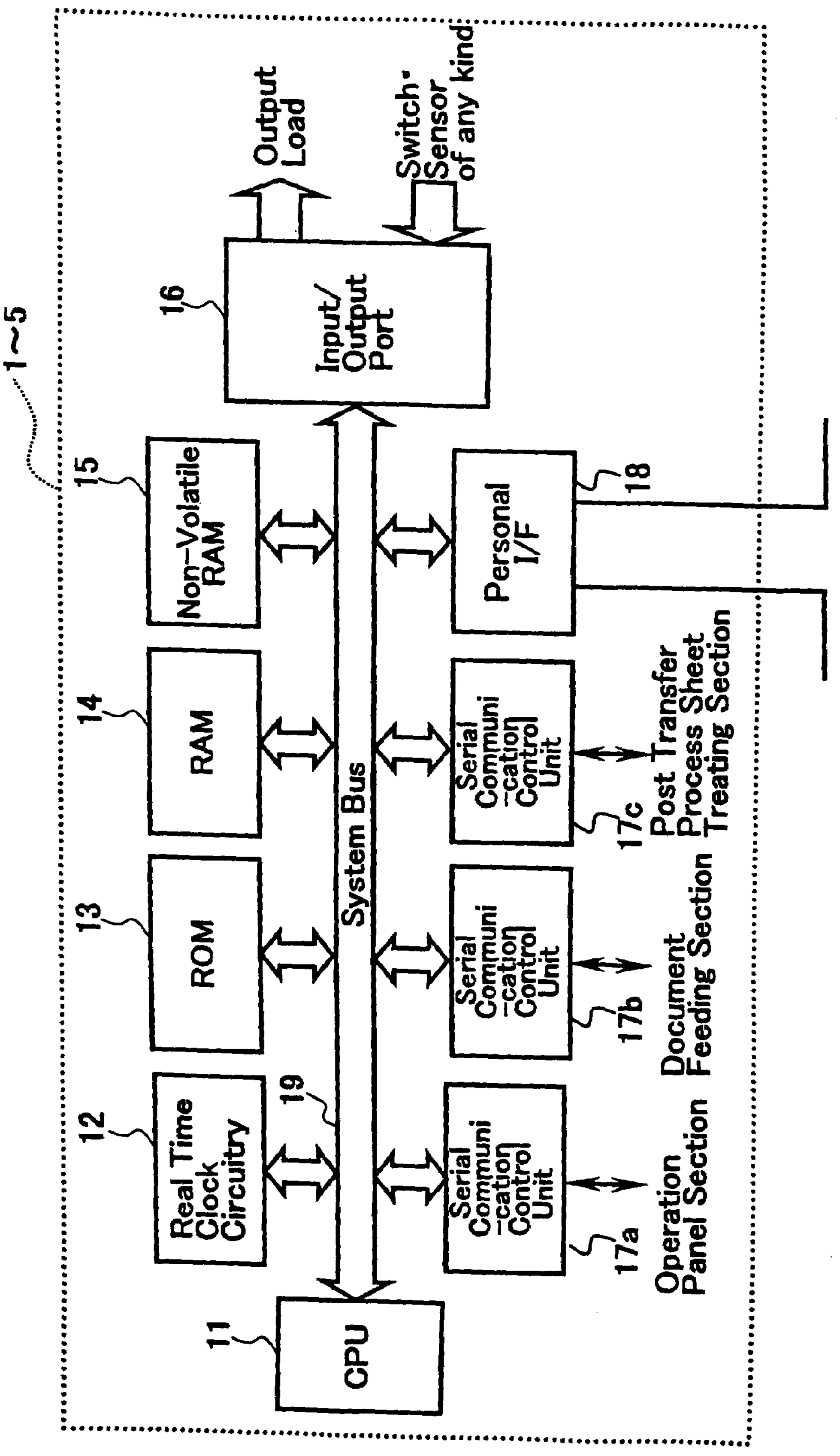
FIG. 2 is a block diagram illustrating an exemplary constitution of a control section of the image-forming apparatuses 1 through 5 illustrated in FIG. 1.

FIG. 2 is a block diagram illustrating an exemplary constitution of a control section of image-forming apparatuses 1 through 5. The control section of the image-forming apparatuses 1 through 5 respectively includes a PPC image-forming apparatus controller having a CPU (central processing unit) 11, a real time clock circuitry 12, a ROM (read only memory) 13, a RAM (random access memory) 14, a non-volatile RAM 15, an input/output port 16, and serial communication control units 17*a*, 17*b* and 17*c*. The control section of the image-forming apparatuses 1 through 5 respectively further includes a personal interface (hereinafter referred to as a P/I) 18 and a system bus 19.

The CPU 11 is a central processing apparatus for generally and entirely controlling the control section using control program stored in the ROM 13. The real time clock circuitry 12 generates time information. The CPU 11 can recognize current time by reading thereof. The ROM 13 is a static memory which stores a variety of static data including control program that the CPU 11 utilizes.

The RAM 14 is a temporary storing memory utilized as work memory or the like which the CPU utilizes when executing data processing. The non-volatile RAM 15 is a memory storing contents of a mode instruction or the like sent from an operation displaying section or the like and is backed up by battery. The input/output port 16 connects with output loads, such as motors, solenoids, clutches or the like, and sensor/switches of any kind provided in the image-forming apparatus.

The serial communication control unit 17*a* executes communication of signals with the operation displaying section. The serial communication control unit 17*b* executes communication of signals with a document feeding section. The serial communication control unit 17*c* executes communication of signals with a post transfer station sheet treating section.

The P/I 18 contains interface circuitry for controlling communication with the data communication apparatus 7. The P/I 18 is employed for relieving load caused by a communication operation of the CPU 11 with the data communication apparatus 7. Of course, it does not raise any problem that a function of the P/I 18 is taken into the CPU 11, if the CPU 11 has a sufficient processing ability. Principle functions of the P/I 18 are described in the following items (1) through (4):

(1) Monitoring of polling and selecting operations from the data communication apparatus 7;

(2) Making positive and negative responses to the data communication apparatus 7;

(3) Checking for justice of the communication data communicated with the data communication apparatus 7 and executing a parity check and a retransmission requesting operation in the occurrence of an error; and (4) Executing a header process for communication data communicated with the data communication apparatus 7.

The system bus 19 is a bus line including an address bus, a control bus, and a data bus. The system bus 19 connects with the CPU 11, the real time clock circuitry 12, the ROM 13, the RAM 14, the non-volatile RAM 15, the input/output port 16, the serial communication control unit 17*a*, 17*b*, and 17*c*, and the P/I 18.

Figure 3:
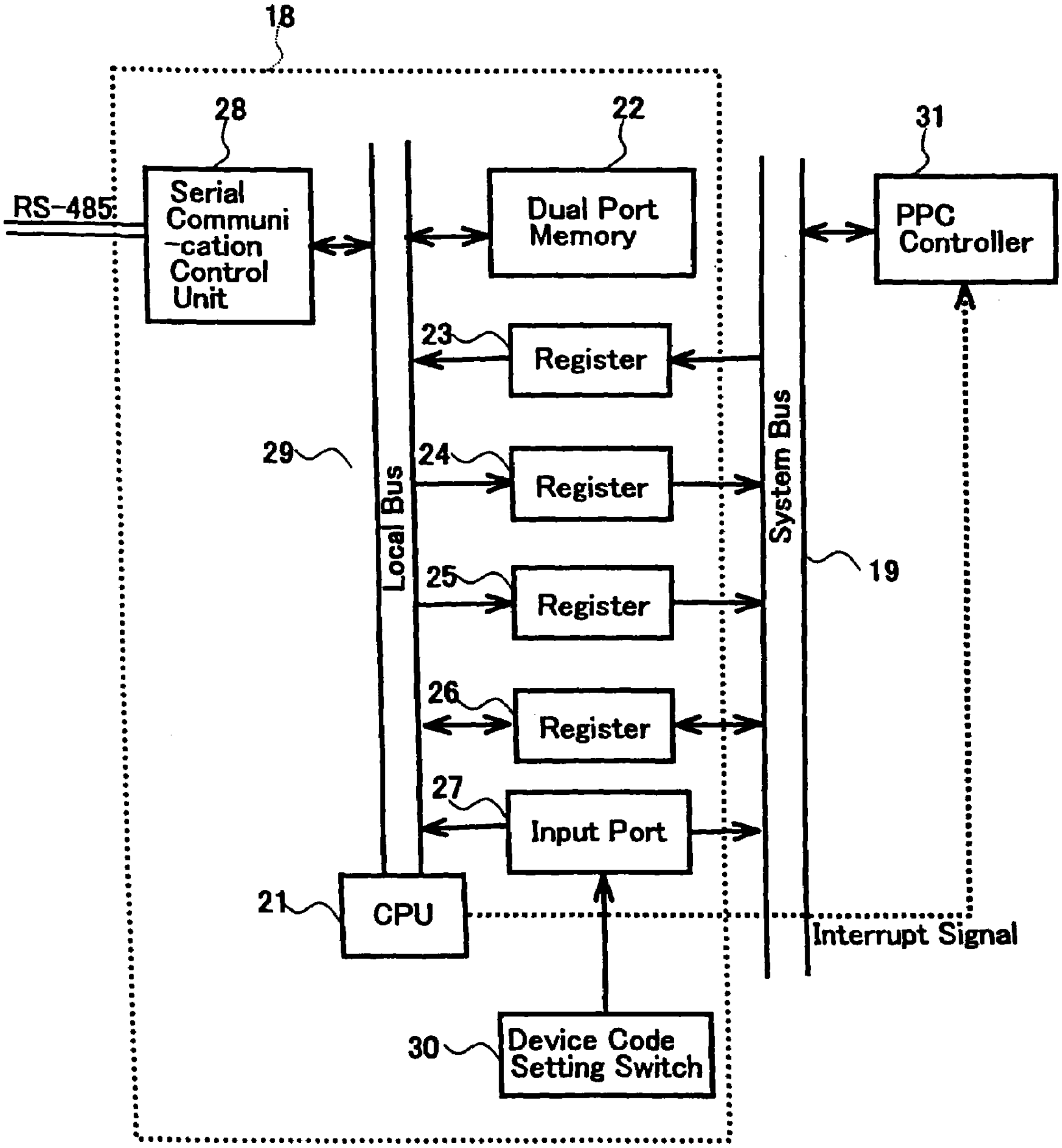
FIG. 3 is a block diagram illustrating an exemplary constitution of a P/I 18 illustrated in FIG. 2.

FIG. 3 is a block diagram illustrating an exemplary constitution of the P/I 18 illustrated in FIG. 2. The P/I 18 includes a CPU 21, a dual port memory 22, resisters 23 through 26, an input port 27, a serial communication control unit 28, a local bus 29, and a device code setting switch 30. The CPU 21 is a one-chip microcomputer including a central processing apparatus, a ROM, and a RAM or the like, and generally controls an entire P/I 18. The dual port memory 22 can be read from and written to by both the CPU 11 illustrated in FIG. 2 and the CPU 21 illustrated in FIG. 4. The dual port memory 22 is a data memory used for communication of text data communicated between the P/I 18 and a PPC controller 31.

The PPC controller 31 may include the above mentioned CPU 11, real time clock circuitry 12, ROM 13, non-volatile RAM 15, input/output port 16, and serial communication control units 17*a*, 17*b*, and 17*c*. The registers 23 through 26 may be used for a control at a time of the above mentioned text data communication. However, a detailed description is omitted from the PPC controller 31. The device code setting switch 30 is the one which sets an inherent device code for each image-forming apparatus and may be used for device code discrimination when polling and selecting from the data communication apparatus 7. The serial communication control unit 28 may be connected with the data communication apparatus 7 and/or a P/I 18 of another image-forming apparatus.

Figure 4:
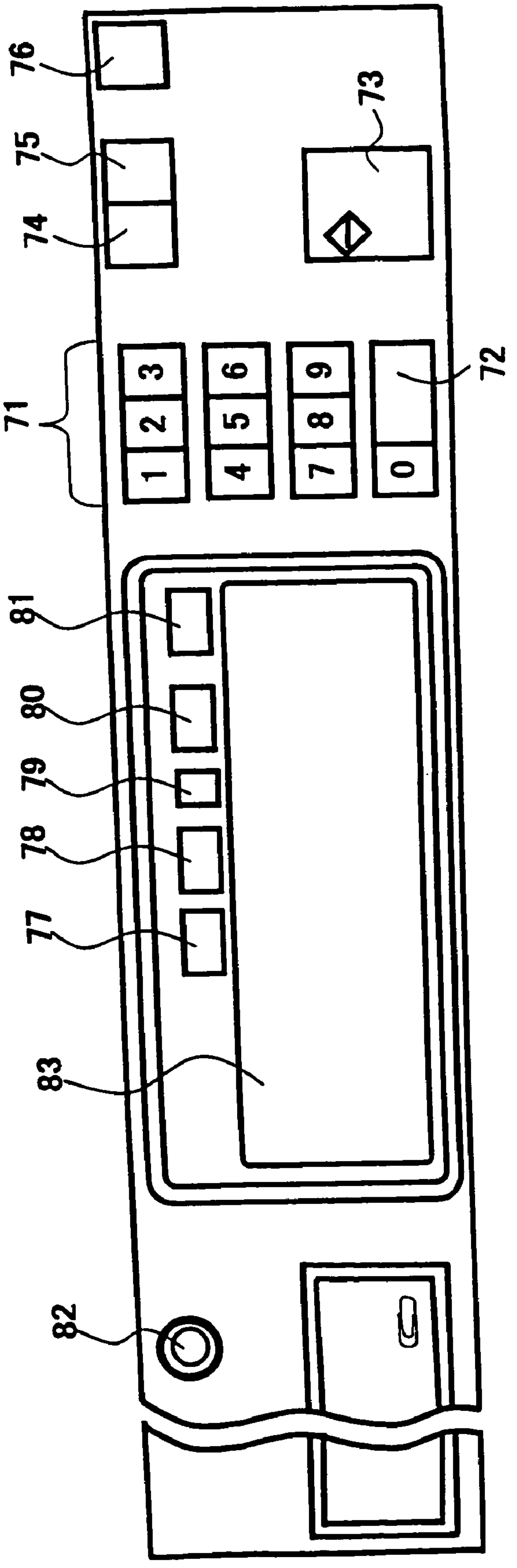
FIG. 4 is a block chart illustrating an exemplary constitution of an operating section of the image-forming apparatuses 1 through 5.

FIG. 4 is a block chart illustrating a layout of an exemplary constitution of an operation displaying section 141 of each image-forming apparatus. The operation displaying section 141 may, as is similar to a conventional control section, include a ROM for storing control program, a CPU for executing a variety of controls using the program, a RAM for temporary storing data, a non-volatile RAM backed up by battery, a serial communication unit, and an input/output port or the like. The operation displaying section 141 may execute data communications with the serial communications unit 17*a*, but the detail thereof is omitted.

The operation displaying section 141 may include, beside the above mentioned control section, a ten key 71, a clear/stop key 72, a print key 73, an enter key 74, an interruption key 75, a preheat/mode clear key 76, a mode confirming key 77, a screen switching key 78, a call key 79, a registering key 80, a guidance key 81, a contrast volume key 82, and a character displaying instrument 83. The ten key 71 is a key for inputting a number of image formations (i.e. the number of copy sheets), and value, for example, of magnification. The clear stop key 72 is a key for either clearing a preset number, or stopping a copy operation.

The enter key 74 is a key for fixing a value and designation of a zoom magnification and a margin size. The interruption key 75 is a key for interrupting copying operation and allowing a copy from another document, for example. The preheat/mode clear key 76 is a key for setting a preheat mode and making an electricity saving condition, and canceling preset contents of all image formation modes. The mode confirming key 77 is a key for confirming each image formation mode selectively displayed in a list on the character displaying instrument 83. The screen switching key 78 is a key for switching a displaying form of the character displaying instrument 83 according to a skill level. The call key 79 is a key for calling user program.

The registering key 80 is a key for registering user program. The guidance key 81 is a key for displaying guidance messages or the like on the character displaying instrument 83. A display use contrast volume key 82 is a key for adjusting contrast of the character displaying instrument 83.

The character displaying instrument 83 may contain full dot displaying elements, such as liquid crystal diodes (LCD) and fluorescent display tubes. The character displaying instrument 83 may further be constituted by a substantially transparent sheet like matrix touch-sensing-panel accommodating a plurality of touch sensors (e.g., for each 8×8 displaying element) and overlaid on the full dot displaying elements. Thus, the character displaying instruments 83 may display an image formation mode (copy mode) screen, for example, as illustrated in FIG. 5 when electrical power source is supplied.

A variety of image formation modes, such as a sheet size (cassette), an image density (copy density), a magnification (same size magnification, reduction, enlargement, sheet designated magnification, a zoom magnification, a size magnification), a duplex mode, a margin mode, and a sort mode, can be optionally selected by depressing or touching the key in the displaying portion on an applicable image formation mode screen.

Figure 5:
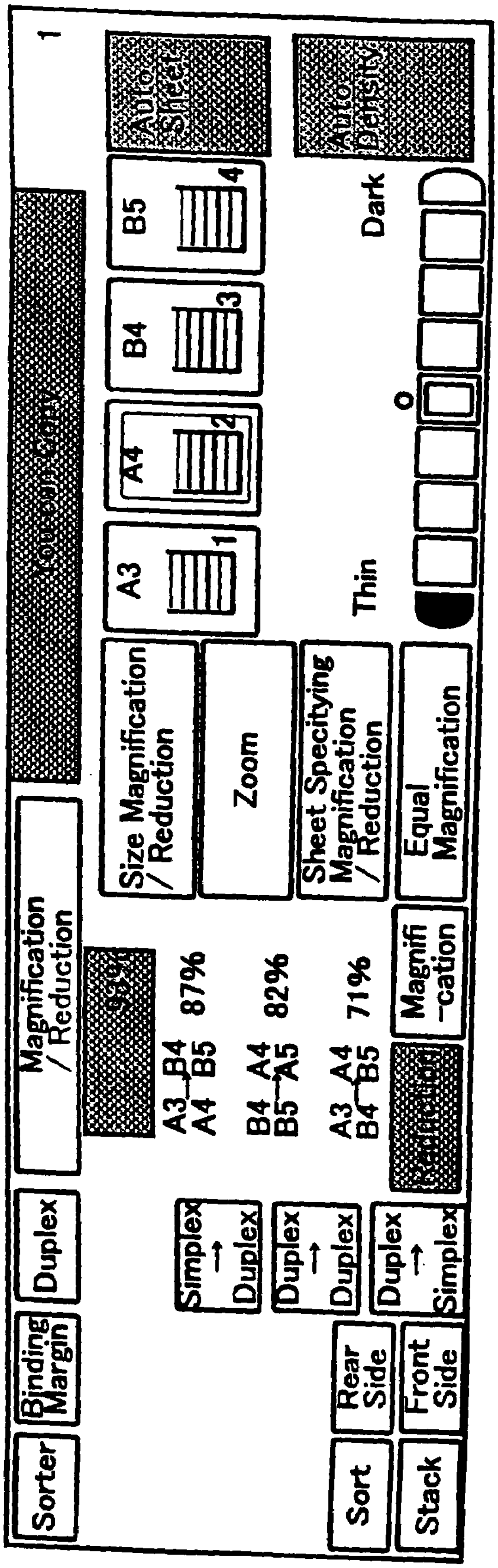
FIG. 5 is a block chart illustrating one example of an image formation mode display displayed on a character display 83 of FIG. 4.

In the example of FIG. 5, 93% is selected as a magnification, an automatic sheet (a cassette accommodating a most preferable size of sheets is automatically selected referring to a document size and a set magnification) is selected as a sheet size, and an auto density (an image density is automatically selected corresponding to density of a document) is selected as an image density. One sheet is selected as a set value.

Figure 6:
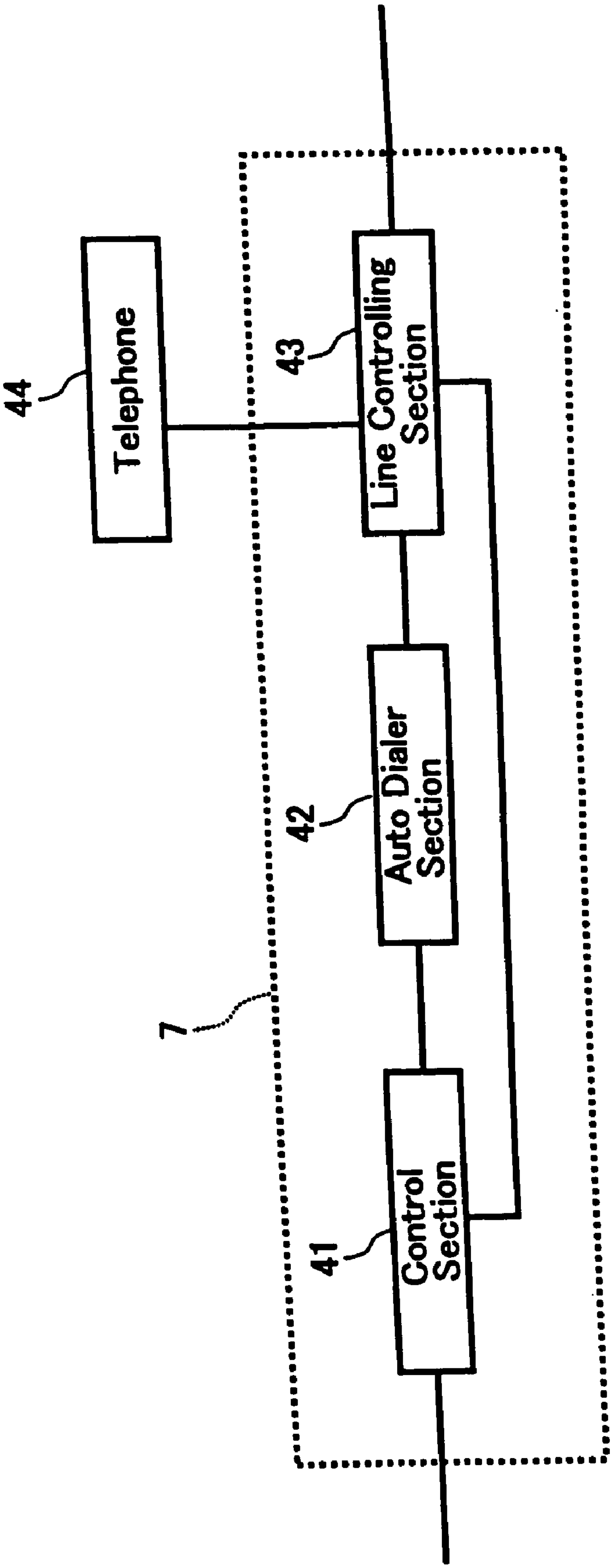
FIG. 6 is a block diagram illustrating an exemplary constitution of a data communication apparatus illustrated in FIG. 1.

FIG. 6 is a block diagram illustrating one example of a data communication apparatus 7 illustrated in FIG. 1. The data communication apparatus 7 may include a control section 41, an auto-dialer section 42 (for automatically dialing a number of the center system 6), and a line control section 42 (for selectively connecting the communications line 300 with the image-forming apparatuses 1 through 5 or a telephone 204). The control section 41 controls five units of image-forming apparatuses 1 through 5 and controls a receiving operation for receiving instruction signals from the center system 6 via the communication line 8.

The auto dialer section 42 executes a self-generating call to the center system 6 in response to reports from the image-forming apparatuses 1 through 5. The line control section 43 may control connection with the communication line 8 and switching to a telephone 44. The control section 41 includes a ROM storing control program, a CPU for executing a variety of controls using the program, a RAM for temporary storing data, a non-volatile RAM backed up by battery, a serial communication control unit, an input/output port, a real time clock for informing a current time or the like.

The non-volatile RAM stores transmitted data transmitted from one side to the other between the center system 6 and the image-forming apparatuses 1 through 5, device codes and identification codes for identifying one unit among the image-forming apparatuses 1 through 5, a telephone number of the center system 6, a number of recall generating times, and an interval of a recall generation or the like.

Hereinbelow, summary functions of the image-forming apparatus supervising system are described. The system has following three basic functions (1) through (3):

(1) Control of communication from the center system 6 to the image-forming apparatuses 1 through 5;

(2) Control of communication form the image-forming apparatuses 1 through 5 to the center system 6 or the data communication apparatus 7; and (3) Unique control for the data communication apparatus 7.

In the control of communication from the center system 6 to the image-forming apparatuses 1 through 5, there exists the following examples (a) through (c):

(a) Reading and resetting of a number of total image-forming sheets, a number of image-forming sheets for each cassette, a number of image formed sheets for each transfer sheet size, a number of miss-feeding times, a number of miss-feeding times for each transfer sheet size, and a number of miss-feeding times for each miss-feed occurring position, of a specified image-forming apparatus;

(b) Setting and reading of an adjustment amount of control voltage, current, resistance, and a process timing for each unit constituting an image-forming apparatus; and (c) Returning a result of communication from each image-forming apparatus to the center system 6, which is executed by the communication control noted in the above item (2).

The above described controls are executed by selecting from the data communication apparatus 7 to the image-forming apparatuses 1 through 5. The selecting represents a function that one unit is selected among the image-forming apparatuses 1 through 5, and communication is executed.

Figure 7:
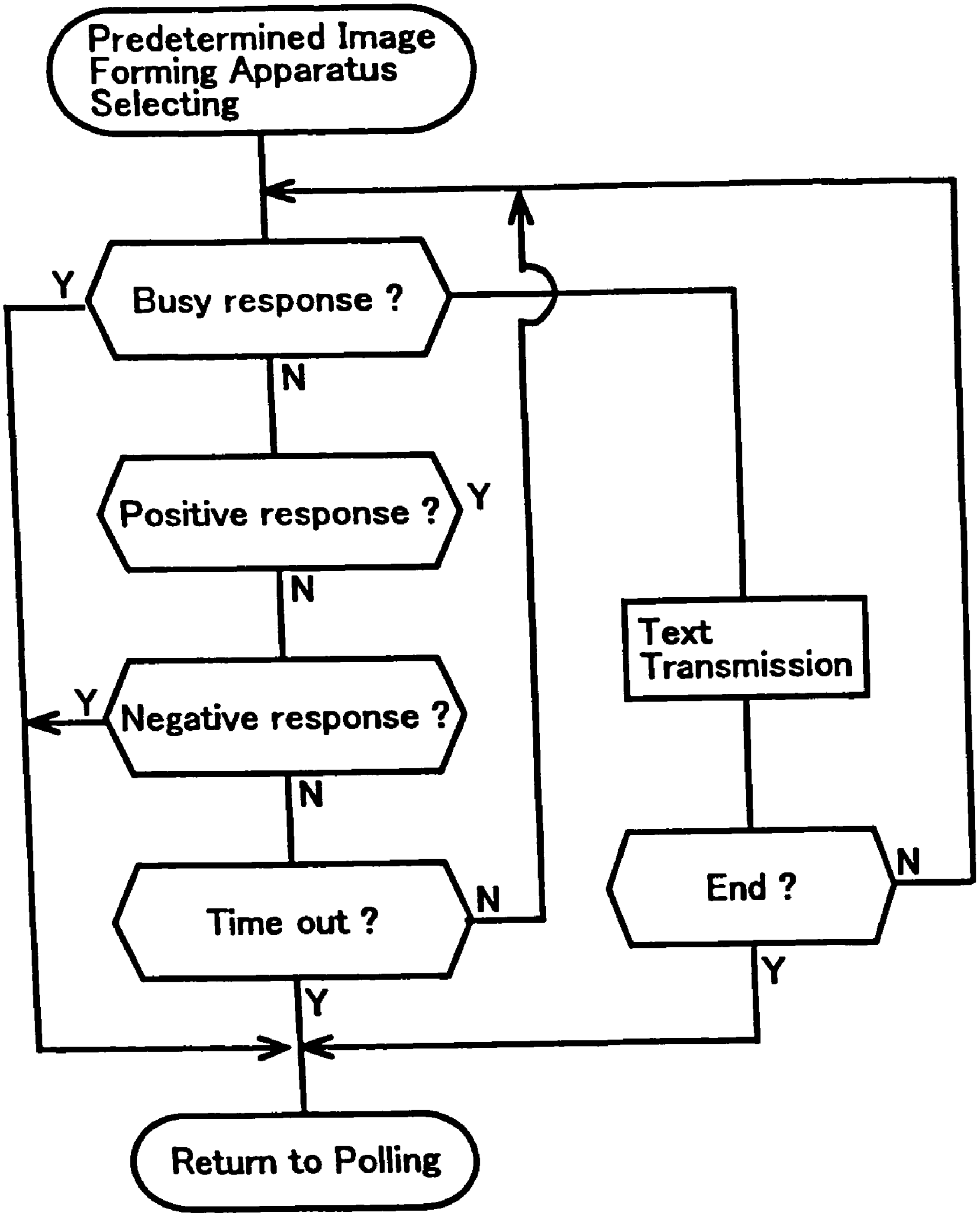
FIG. 7 is a flowchart illustrating one example of a selecting operation executed in the data communication apparatus of FIG. 1.

One example of a selecting operation executed in the data communication apparatus 7 is illustrated in FIG. 7 using a flowchart. Each image-forming apparatus 1 through 5 has a unique (specified) device code, respectively. The data communication apparatus 7 outputs a predetermined specified code (or a combination of codes) indicating a selecting function, and a device code of an image-forming apparatuses to be selected to a serial communications interface RS-485. Each image-forming apparatus 1 through 5 is recognized by referring to a code (or a combination of codes) indicated by a selecting function. The selecting function compares a device code with a specified device code. Both codes must be in accord with each other. The selected image-forming apparatus outputs a busy response (Busy) having a predetermined specified code (or a combination of codes) if data to be sent exists therein.

The data communication apparatus 7 stops the selecting operation and starts the following polling operation when receiving the busy response. The selected image-forming apparatus determines if it is possible to respond to a selecting operation when no data exist therein. If it is possible, the image-forming apparatus outputs a positive response including a predetermined specified code (or a combination of codes) and executes communication with the data communication apparatus 7.

If a response is impossible, the image-forming apparatus outputs a negative response including a code (or a combination of codes) and ends communication with the data communication apparatus 7. Further, the data communication apparatus 7 ends the selecting operation after a predetermined time has elapsed, if the image-forming apparatus corresponding to the device code outputted by the data communication apparatus 7 outputs neither a positive response nor a negative response by a reason for example of having no electrical power source or the like.

In the control operation of communication from the image-forming apparatuses 1 through 5 to the center system 6 or the data communication apparatus 7, there exists the following examples (a) through (e):

(a) Each image-forming apparatus 1 through 5 immediately reports urgent information data indicating an effect to the center system 6 via the data communication apparatus 7 and the communication line 8, when an abnormality disables the operation of the image-forming apparatus;

(b) Each image-forming apparatus 1 through 5 immediately reports urgent information indicating a request to the center system 6 via the data communication apparatus 7 and the communication line, when a user (i.e., a customer) changes a mode from an image-formation mode to a user requested input mode for inputting a user-requested repair request and a consumable article request which is different from the image-formation mode obtained by depressing a key on the operation displaying section, or when a user-requested inputting screen is displayed on the character displaying instrument 83 and the user request is inputted by depressing a specified key on the screen;

(c) Each image-forming apparatus 1 through 5 immediately reports an urgent report on any effect to the center system 6 via the data communication apparatus 7 and the communication line 8, when for example a total number of image-formed sheets has reached a predetermined number of sheets (i.e., a contracted number of sheets);

(d) Each image-forming apparatus 1 through 5 reports a non-urgent report at a predetermined time an effect to the center system 6 via the data communication apparatus 7 and the communication line 8, when a total number of image-formed sheets has reached a predetermined number of sheets within a predetermined term; and (e) Each image-forming apparatus 1 through 5 reports via the data communication apparatus 7 and the communication line a non-urgent report stored in the data communication apparatus 7 at a designated time set by the center system 6 indicating an effect to the center system 6, when events such as for example closing a designated number of times, a designated time period for usage of spare parts, or the arrival of a sensor at a standard level, respectively enabling image formation but requiring future maintenance. In such a communication control, a control of transmission to the center system 6 occurs before the designated time, which is executed when the predetermined number of times or the like comes earlier than the designated time.

Figure 8:
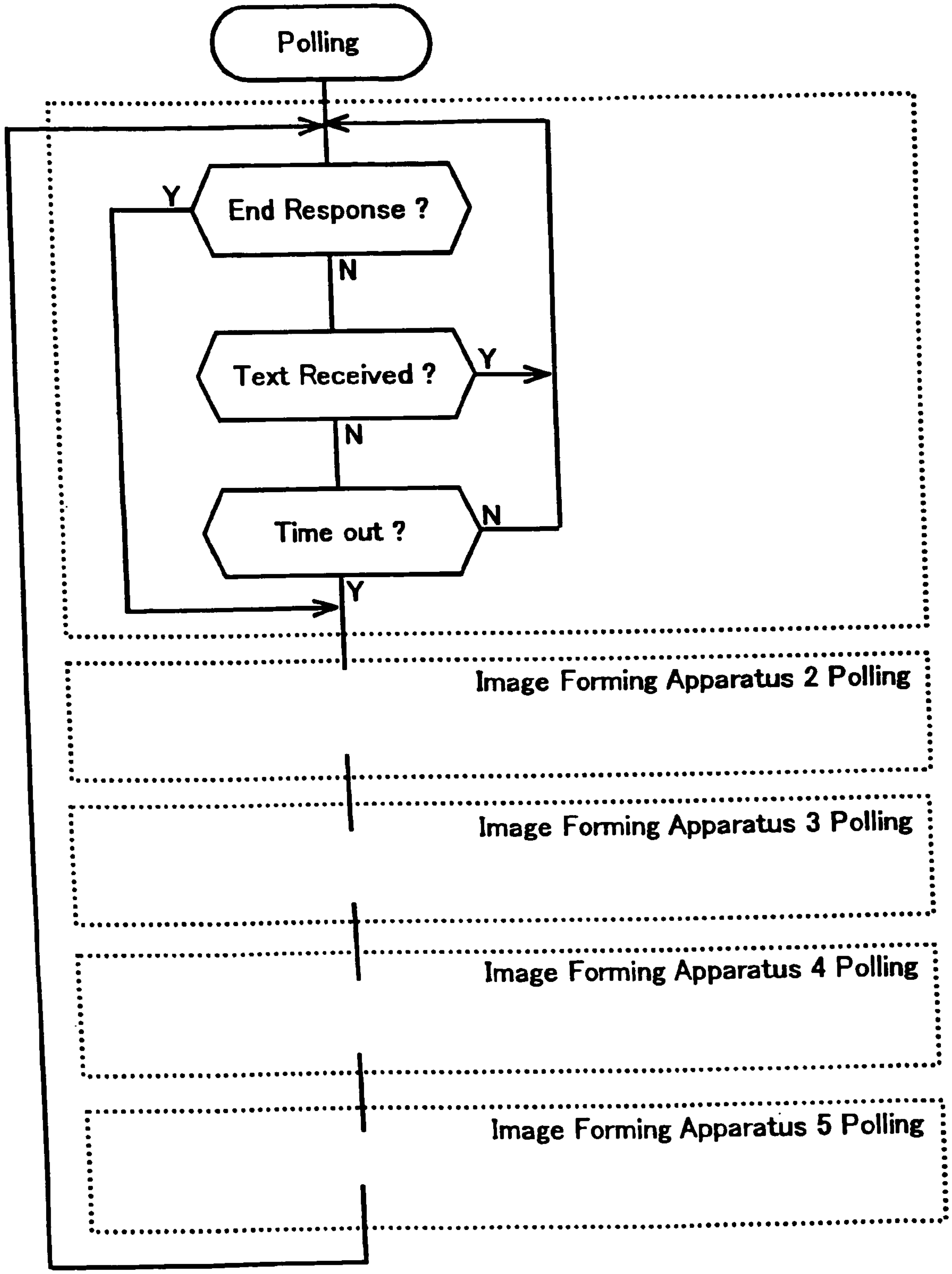
FIG. 8 is also a flowchart illustrating one example of a polling operation.

The above described communications are executed when polling. The polling represents a function that five connected image-forming apparatuses 1 through 5 are subsequently designated, and it is confirmed if a communication request from the designated image-forming apparatus exists. The polling operation in the data communication apparatus 7 is illustrated in FIG. 8 using a flowchart. The data communication apparatus 7 sends a specified code (or combination of codes) indicating a predetermined polling function and a device code of an image-forming apparatus to be selected to the serial communication interface RS-485. Each image-forming apparatus 1 through 5 can recognize if it is designated for polling by comparing the polling indicating specified code to its own device code.

Then, if data to be transmitted via communication request either to the data communication apparatus 7 or the center system 6 exists, the designated image-forming apparatus starts communication with the data communication apparatus 7, outputs an end response having a predetermined specified code (or combination of codes), and, when having completed the communication started or no communication request exists, ends the communication with the data communication apparatus 7. The data communication apparatus 7 moves to polling the next image-forming apparatus.

Further, the data communication apparatus 7 ends a polling operation after a predetermined time has elapsed, if an image-forming apparatus does not start communication even if the output was an end response due to turning OFF of electrical power source or the like. The polling operation is continuously executed to each image-forming apparatuses 1 through 5 in turn.

Examples (a) and (b) as follows include the unique control of the data communication apparatus:

(a) Reading of a total counter value (i.e., an integrated image formed sheet number); and.

(b) Returning of a communication result executed from image-forming apparatuses 1 through 5 to the data communication apparatus 7 under the communication control (2).

The reading control of the total counter value is executed by the selecting operation executed from the data communication apparatus 7 to the image-forming apparatuses 1 through 5 once a day at a predetermined time (i.e., at noon, or at a time when electrical power source is supplied again if the electrical power source of the image-forming apparatus is turned off at noon). The data communication apparatus 7 has two memories (i.e, memory A and memory B) for use in a total copy counter. A total counter value read by the above-noted selecting operation executed one a day is written in memory A. Therefore, the value of the day before, stored in memory A, is overwritten every day except for a case where electrical power source of the image-forming apparatus never turns on all day, such as for example on Sunday.

The total counter value stored in memory A is copied once a month to memory B at the predetermined time of a predetermined day (i.e., closing day). These times and days are set by the center system 6 and are stored in the non-volatile RAM in the data communication apparatus 7.

The data communication apparatus 7 sends contents of the memory B to the center system 6 in two different ways described in (a) and (b) as follows.

(a) The center system 6 reads the total counter value after the above-noted day and time. The contents of memory A are copied to the memory B. Namely, the center system 6 accesses (i.e., transmits an applicable reading instruction by generating a call to) the data communication apparatus 7 and obtains contents (total counter value of each image-forming apparatus 1 through 5) of memory B transmitted from the data communication apparatus 7; and (b) The data communication apparatus 7 sends the total counter value to the center system 6 via the communication line 8 by generating a self-call after the above noted day and time. The time and day of such self-call are set by the center system 6 and are stored in the non-volatile RAM.

Further, the data communication apparatus 7 has a plurality pair of memories combined A with B. The reason is that a variety of total counter values, such as for example a value of a mono-color copy and a value of a full-color copy, and a value of an application copy can exist.

Figure 9:
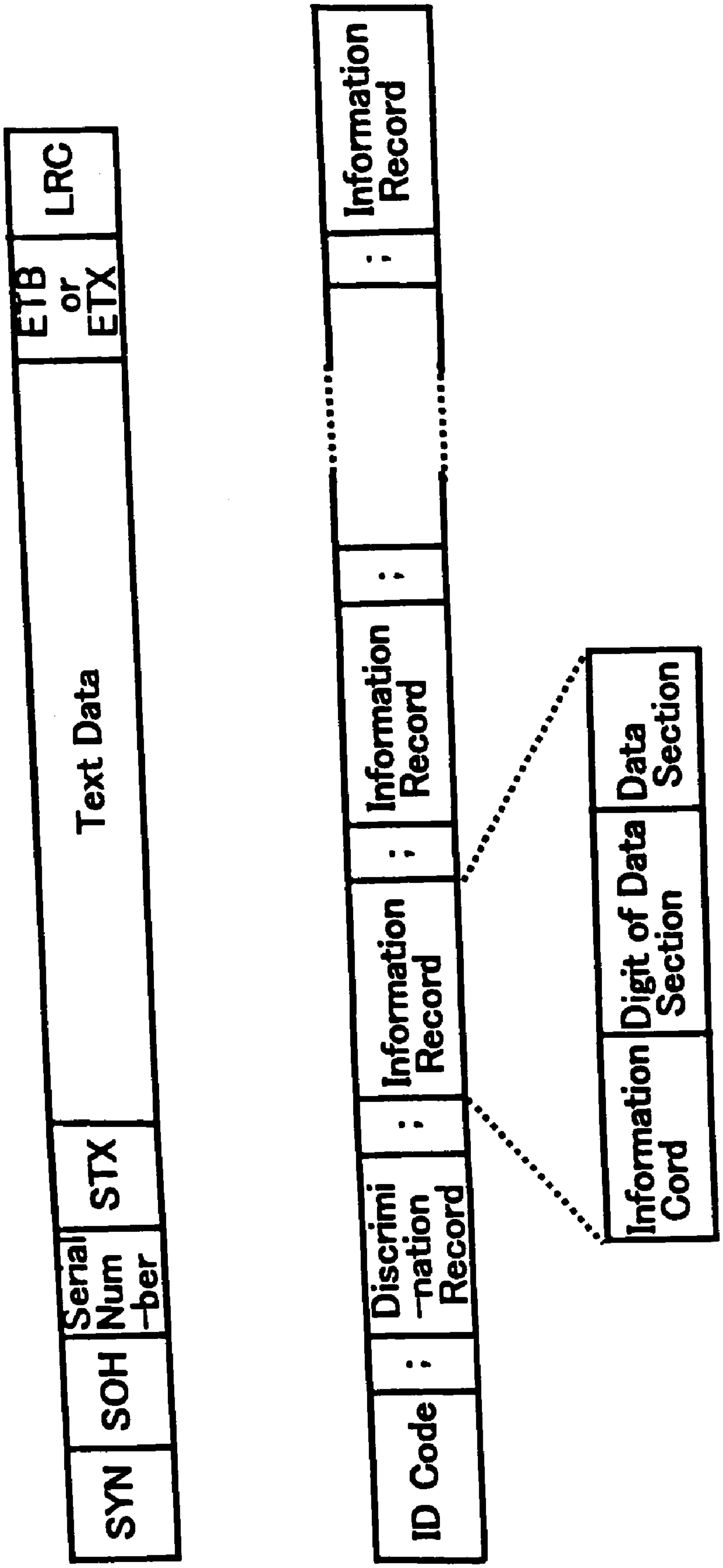
FIG. 9 is a chart illustrating an exemplary constitution of text data communicated between the center system 6 and the data communication apparatus 7 illustrated in FIG. 2.

FIG. 9 is a chart illustrating an exemplary constitution of text data communicated between the center system 6 and the data communication apparatus 7. In FIG. 9, a serial number indicates a communication block number established during one communication. A serial number 01 is put to the first bock, and numbers increasing by one are put to the following blocks, and the serial number returns to 00 after 99. An identification (ID) code has an object to identify both a data communication apparatus 7 and one unit of an image-forming apparatus among the five image-forming apparatuses connected to the data communication apparatus 7. A distinction code comprises a code indicating a kind of a communication object (hereinafter referred to as an operation code). A transfer source and a receiving destination of the text data is added to the operation code. Such an operation code is predetermined as listed in the table illustrated in FIG. 10.

An information record comprises an information code, a data section digit number, and a data section and is predetermined as listed in the table illustrated in FIG. 11. A plurality of semicolons (;) is respectively inserted as data separators between the ID code and the operation code. The operation code and the information record, and the information records is illustrated in FIG. 12.

Figure 12:
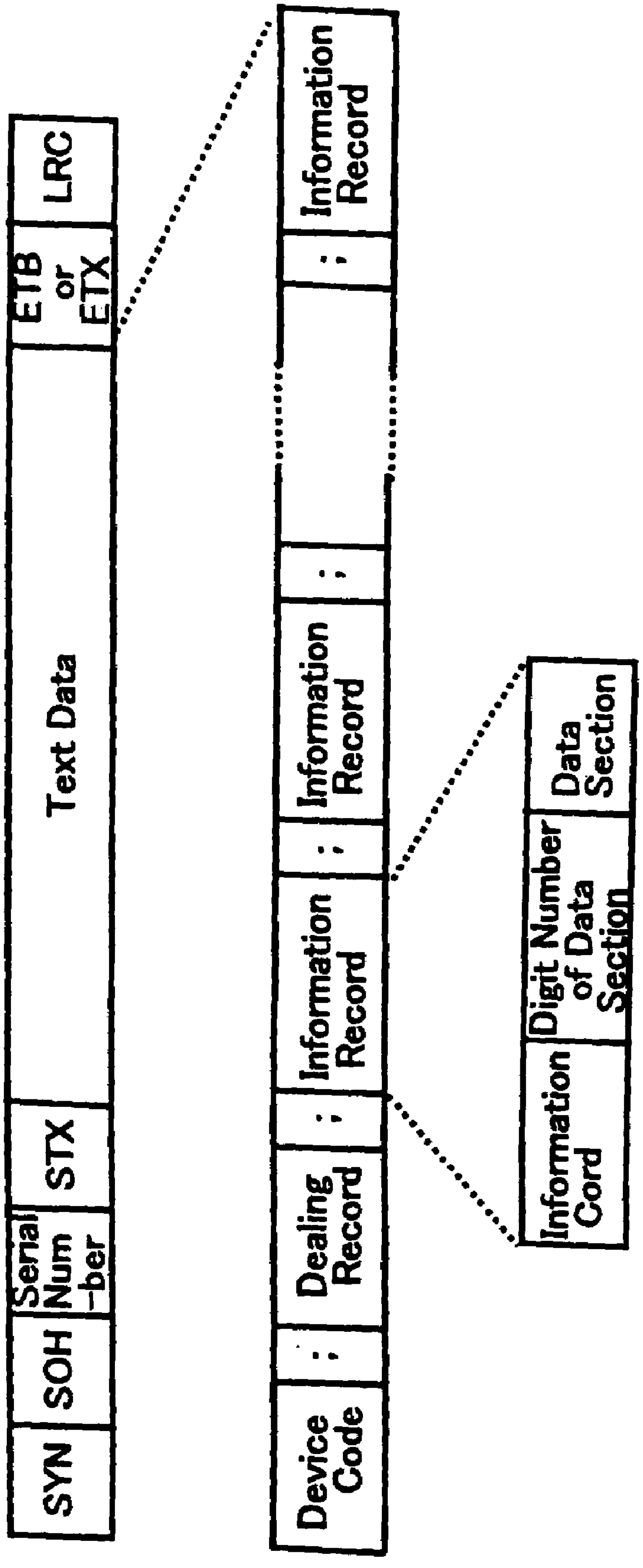
FIG. 12 is a block chart illustrating an exemplary constitution of each client 18 illustrated in FIG. 1.

FIG. 12 is a block chart illustrating an exemplary constitution of text data communicated between the data communication apparatus 7 and P/I 18 of the image-forming apparatuses 1 through 5. A device code is uniquely set for identifying a communications desired device to each image-forming apparatus 1 through 5 using the device code setting switch 30 (refer to FIG. 3) as mentioned above. Linkage with the ID code illustrated in FIG. 9 is made when an install is first executed by connecting an image-forming apparatus with the data communication apparatus 7, by reading from the image-forming apparatus, and by storing thereof in the non-volatile RAM of the data communication apparatus 7. The device code is thereafter optionally converted depending on a sending direction. The operation code is a code representing a kind of a communication object as described above and is constructed by deleting both a transmitting source and a receiving destination from the distinction code illustrated in FIG. 10.

These codes are optionally added to and deleted from the text data depending on the sending direction of the text data.

Figure 13:
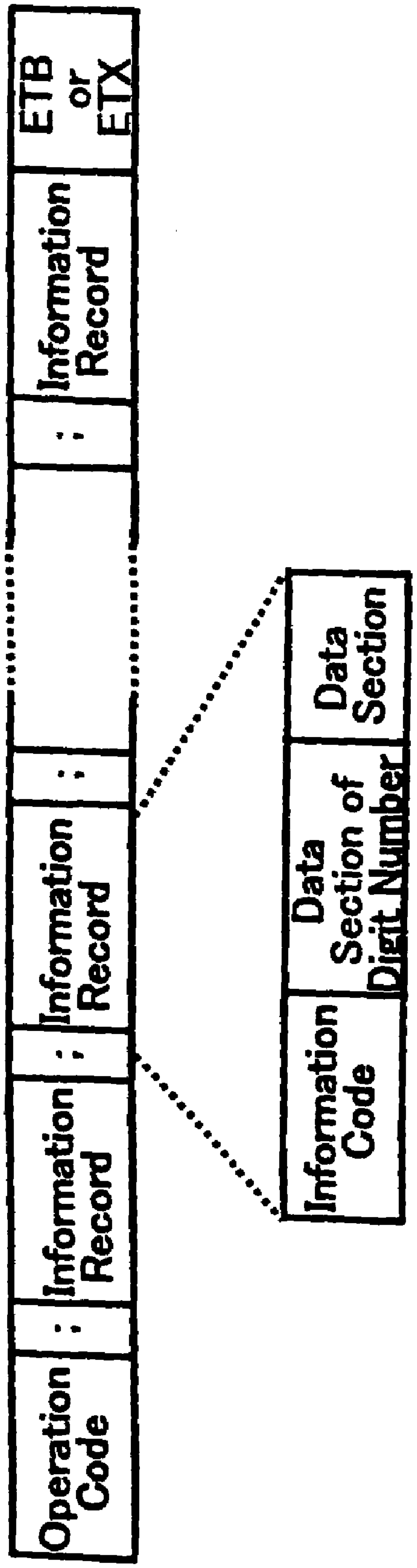
FIG. 13 is a block chart illustrating an exemplary constitution of a server 120.

FIG. 13 is a block chart illustrating an exemplary constitution of text data communicated between the P/I 18 and the PPC controller 31 (refer to FIG. 3) of the image-forming apparatuses 1 through 5. The text data is constructed by deleting a header, a device code, and a parity portion from the text data communicated between the data communication apparatus 7 and the P/I 18.

Hereinbelow, a reporting operation executed in image-forming apparatuses 1 through 5 is described in more detail referring to FIGS. 14 through 17. A plurality of matters are to be considered, when determining a form of a reporting method reporting from the image-forming apparatuses 1 through 5 to the center system 6. For example, how an operation displaying screen (i.e., a display screen of the character display instrument illustrated in FIG. 4) displays, how a report to the center system 6 is timed, and how a result of a report to the center system 6 is determined are considered. These are described all together in (a) through (c) as follows:

(a) Regarding the display of an operation displaying screen when reporting, (a-1) a display of an image formation mode (i.e., a display of an ordinal image formation mode screen) is displayed as it is reported, and (a-2) some messages relating to an auto report, such as for example messages telling that "an auto report is in the process" are displayed thereon.

(b) Regarding the timing of a report to the center system 6, (b-1) the effect of an occurrence of a reporting reason problem is quickly reported when it occurs, (b-2) a report is made at a predetermined time of an applicable day for simultaneously reporting from all image-forming apparatuses. In the above described predetermined time report, information representing the effect of an occurrence of a report reason is transmitted from the image-forming apparatuses 1 through 5 to the data communication apparatus 7, and the data communication apparatus 7 collects all reports occurring up to the predetermined time. The data communication apparatus 7 reports simultaneously so that all reports arrive at a predetermined time.

(c) Regarding the determination of a result of a report to the center system 6, (c-1) a result is displayed as it is received, and (c-2) a result can be confirmed later, or (c-3) a result can not be confirmed (i.e., a needless report).

Hereinbelow, a reporting form for each auto report reason noted above is described in the following items (1) through (5).

(1) An urgent report is made immediately to the center system 6 when a problem causes the image-forming process to become inoperative, and the report is executed in a manner as described in items (a-2), (b-1) and (c-1). However, if a problem occurs in a specified function and the function is not selected by the user, the problem is dealt with in a manner as mentioned in (a-1), (b-1) and (c-2).

(2) An urgent report is made immediately to the center system 6 when the user by depressing a key on the operation display section inputs a necessary request such as for example a repairing request or a consumable item supplying request. This report is executed in a manner as described in the following items (a-2), (b-1) and (c-1).

(3) An urgent report is made immediately to the center system 6 when an integrated number of image formed sheets has reached a predetermined number of sheets. This report is executed in a manner as described in the following items (a-1), (b-1), and (c-3).

(4) When an event requiring a provisional maintenance occurs, (i.e., replacing parts having reached a designated number of usage times, or a part closes to a standard level, but an image formed operation is possible), a non-urgent report, which is made to the center system 6 at a designated time at each day, is executed in a manner as described in items (a-1), (b-2) and (c-3).

(5) A non-urgent report, which is made to the center system 6 at a predetermined time when an integration number of image-formation sheets has reached a predetermined number of sheets within a predetermined time, is executed in a manner as described in items (a-1), (b-2) and (c-3).

Figure 14:
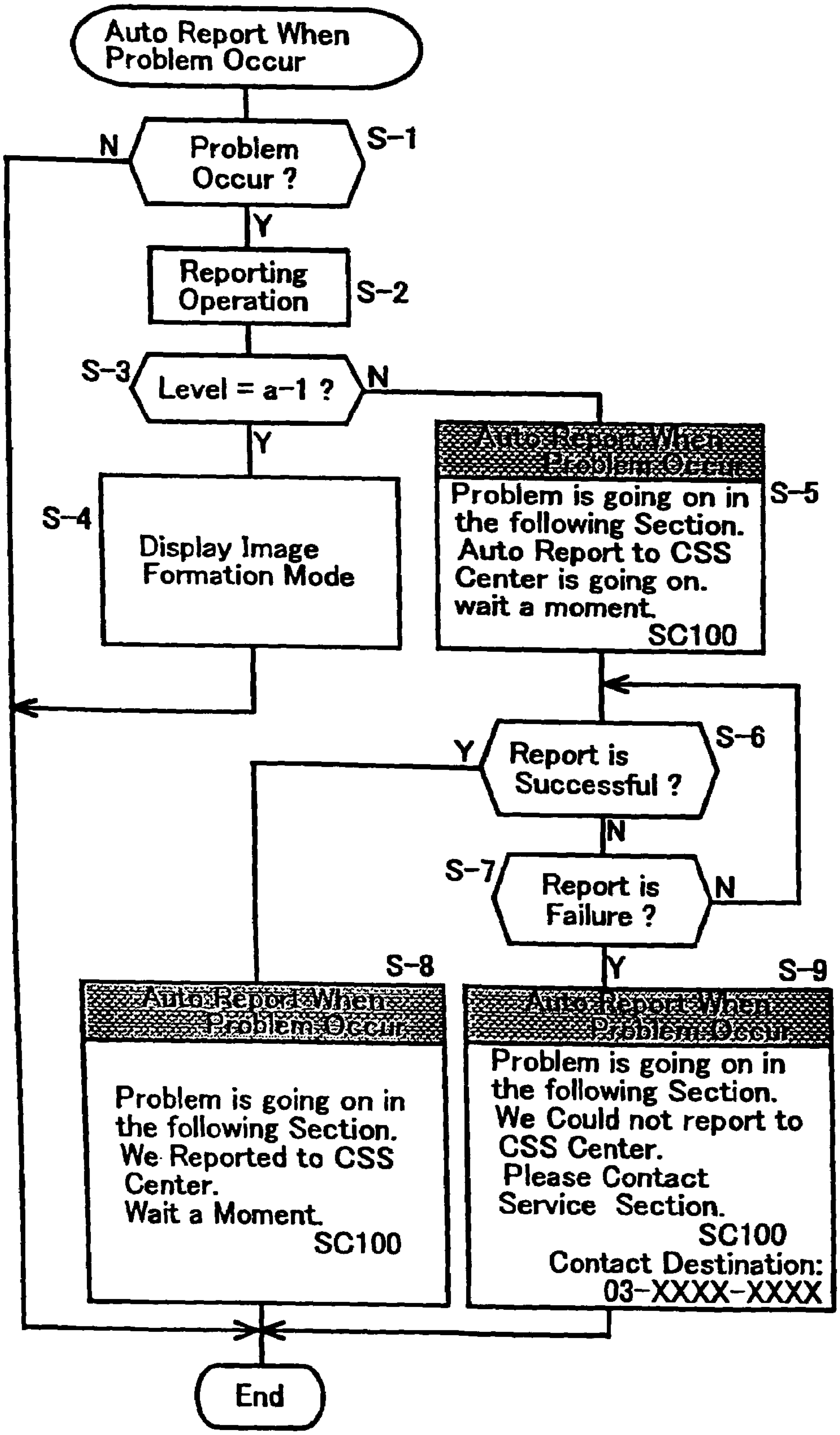
FIG. 14 is a flowchart illustrating one example of an automatic reporting operation in a case of occurrence of a problem in the image-forming apparatuses 1 through 5 illustrated in FIG. 1.

FIG. 14 is a flowchart illustrating one example of an auto report operation when a problem occurs in the image-forming apparatus 1 through 5. When detecting the occurrence of a problem, each image-forming apparatus 1 through 5 executes in step S-2 a reporting operation for reporting information representing such effect to the center system 6 via the data communication apparatus 7 and the communication line 8.

Each reason of a problem is classified in step S-3 into a plurality of levels, namely it is determined if a level of the problem belongs to the above-described level of a-1 (the image formation mode display is continued as it is) or the level of a-2 (messages relating to an auto report such as messages telling that an auto report is in progress). If it belongs to the level a-1, the image formation mode display of the character displaying instrument 83 is continued in step S-4. Thus, the user does not recognize occurrence of such a problem in this case because the problem is not required to be recognized.

If the problem, on the other hand, belongs to the level a-2, messages telling that "an auto report is going on due to the problem" are displayed on the character displaying instrument 83, and a customer is notified in step S-5. In steps S-6 and S-7, it is determined if the auto report was successful or not, and such a result is displayed on the character displaying instrument 83, and the customer is notified in steps S-8 and S-9. Thus, the customer can take a next action after recognizing contents of the display.

Figure 15:
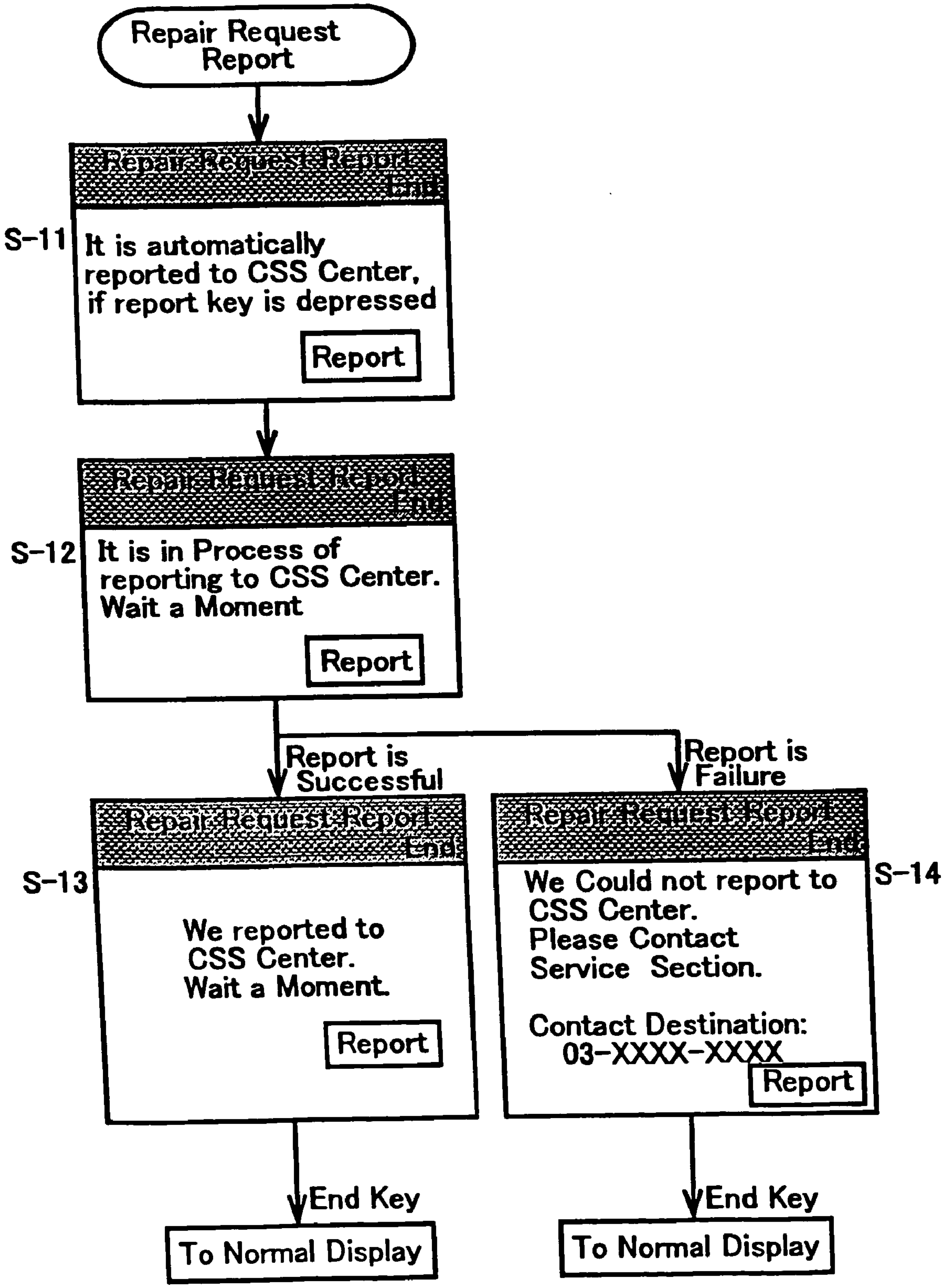
FIG. 15 is a flowchart illustrating one example of a repair request reporting operation.

FIG. 15 is a flowchart illustrating one example of a repair request reporting operation in the image-forming apparatuses 1 through 5. Since a display form of the operation displaying screen at a time of reporting in this case is necessarily determined as a-1, and is substantially the same as in the level a-1 illustrated in FIG. 14, a detailed description is omitted.

Further, the display of the repair request reporting screen in step S-11 can be executed cooperatively by depressing of the ten keys illustrated in FIG. 4 or the like.

Further, in the image-forming apparatuses 1 through 5, the reporting reasons are divided into at least two levels, an urgent event and a non-urgent event. Further, it is possible to execute an operation described in the following item (1) when the requested reason of a non-urgent event occurs and (2) when the requested reason of an urgent event occurs in an operation described in the following items:

(1) An image-forming process is not inhibited, and the character displaying instrument 83 of the operation displaying section continuously displays the image formation mode display as it is.

(2) An image-forming process is inhibited, and at same time, the character displaying instrument 83 of the operation displaying section displays the messages relating to an auto report such as for example messages telling that "an auto report is going on".

The report reasons divided into the level of the non-urgent event are described in the following items (a) through (d):

(a) A problem occurring in only a specified function; however, it is assumed that the function is not selected at the time of the occurrence of the problem;

(b) Arrival of an integrated number of image formed sheets to a predetermined number;

(c) An event requiring provisional maintenance such as for example arrival of replacing parts at a designated number of usage times, closing thereof at a designated time period, or arrival of a sensor at a standard level; and (d) Arrival of an integrated number of image formed sheets at a predetermined level within a predetermined time period.

The reporting reasons divided into the urgent event are described in the following items (f) and (g):

(f) a problem causing an image-forming operation to be impossible, and (g) input of a necessary request such as for example a repair request and a consumable item supplying request made by a customer.

An auto reporting operation and a repair request reporting operation in the image-forming apparatuses 1 through 5 are executed in the same manner as described in FIGS. 14 and 15.

Further, in the image-forming apparatuses 1 though 5, a problem becomes an urgent event when a specified function which can not be used is selected does it. The problem is regarded as a non-urgent event, if a reporting reason comes from occurrence of the problem and the function is not selected. The above mentioned operation of the item (1) is preferably executed in the case of occurrence of the reporting reason divided into the non-urgent event and the item (2) in the case of occurrence of the reporting reason divided into the urgent event. Problems respectively occurred such as for example in a duplex tray, an auto document feeding section, or a post transfer station sheet treating section correspond to the problem that a specified function can not be used.

Figure 16:
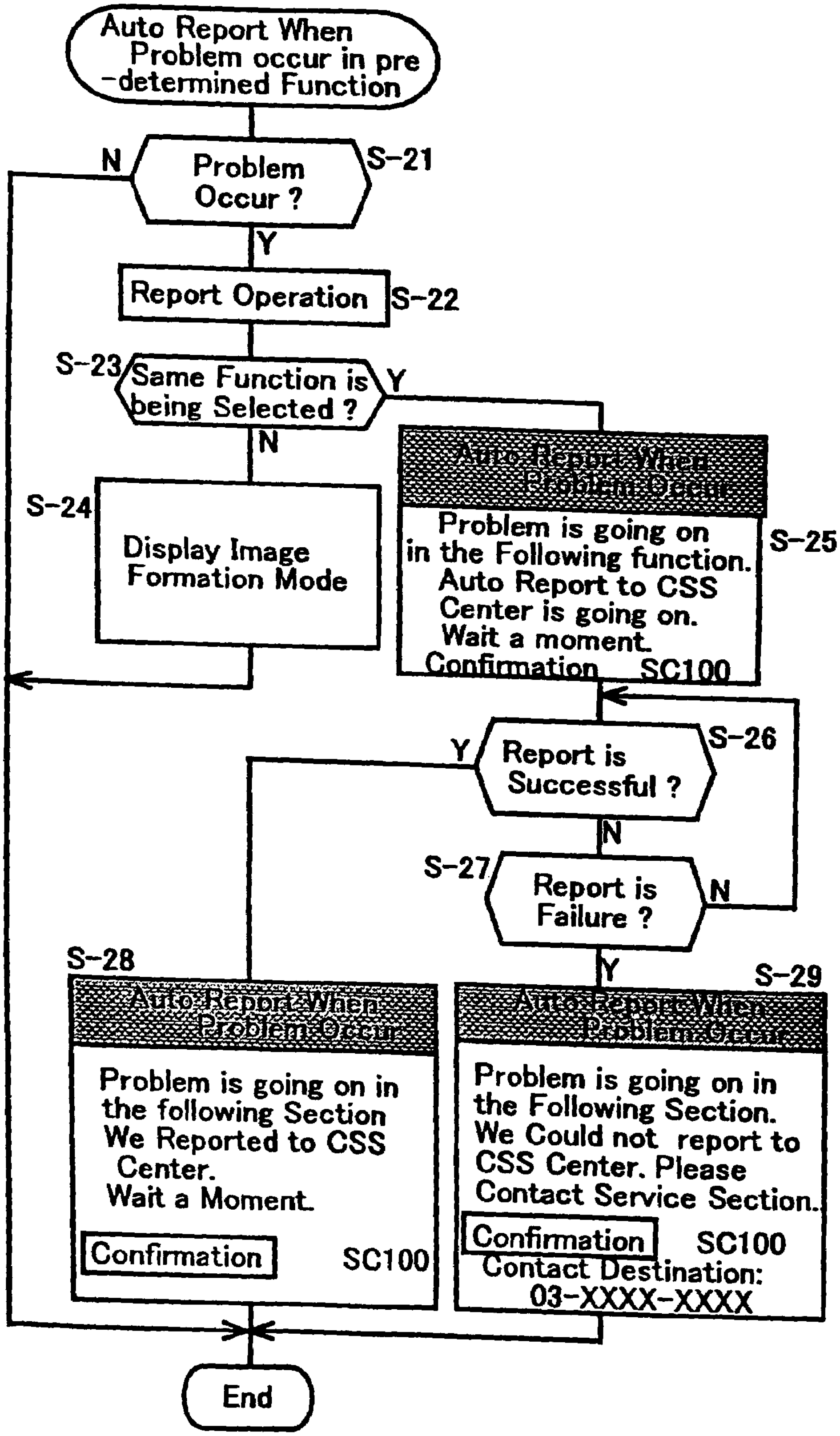
FIG. 16 is a flowchart illustrating one example of an auto reporting operation executed when a problem occurs in a specified function.

One example of an auto reporting operation executed when a specified function problem occurs in the image-forming apparatuses 1 through 5 is illustrated in FIG. 16 using a flowchart. For example, since a duplex mode (a specified function) requiring a duplex tray can not be selected if a problem occurs in the duplex tray, information representing occurrence of such a problem in step S-22 is automatically reported to the center system 6 when executing an image formation using the duplex mode. At same time, the image formation is interrupted (i.e., inhibited), and messages telling that "an auto report is going on due to occurrence of a problem" are displayed on the character display instrument 83 of the operation displaying section, and the occurrence of the problem is notified to a customer in step S-25.

Further, if the user executes a simplex mode image formation when a problem exists in the duplex tray, information representing occurrence of such a problem is automatically reported to the center system 6 in step S-22, but an image formation mode display is continuously displayed on the character display instrument 83 of the operation displaying section in step S-24, because the image formation is not interrupted, and it is not necessary to notify the customer of the problem occurrence.

Further, if the image-forming operation is not executed when the problem in the duplex tray occurs, information representing occurrence of such a problem is automatically reported to the center system 6 in step s-22. At this instance, whether the problem occurrence is notified to the customer is determined by whether the duplex mode is selected.

Figure 17:
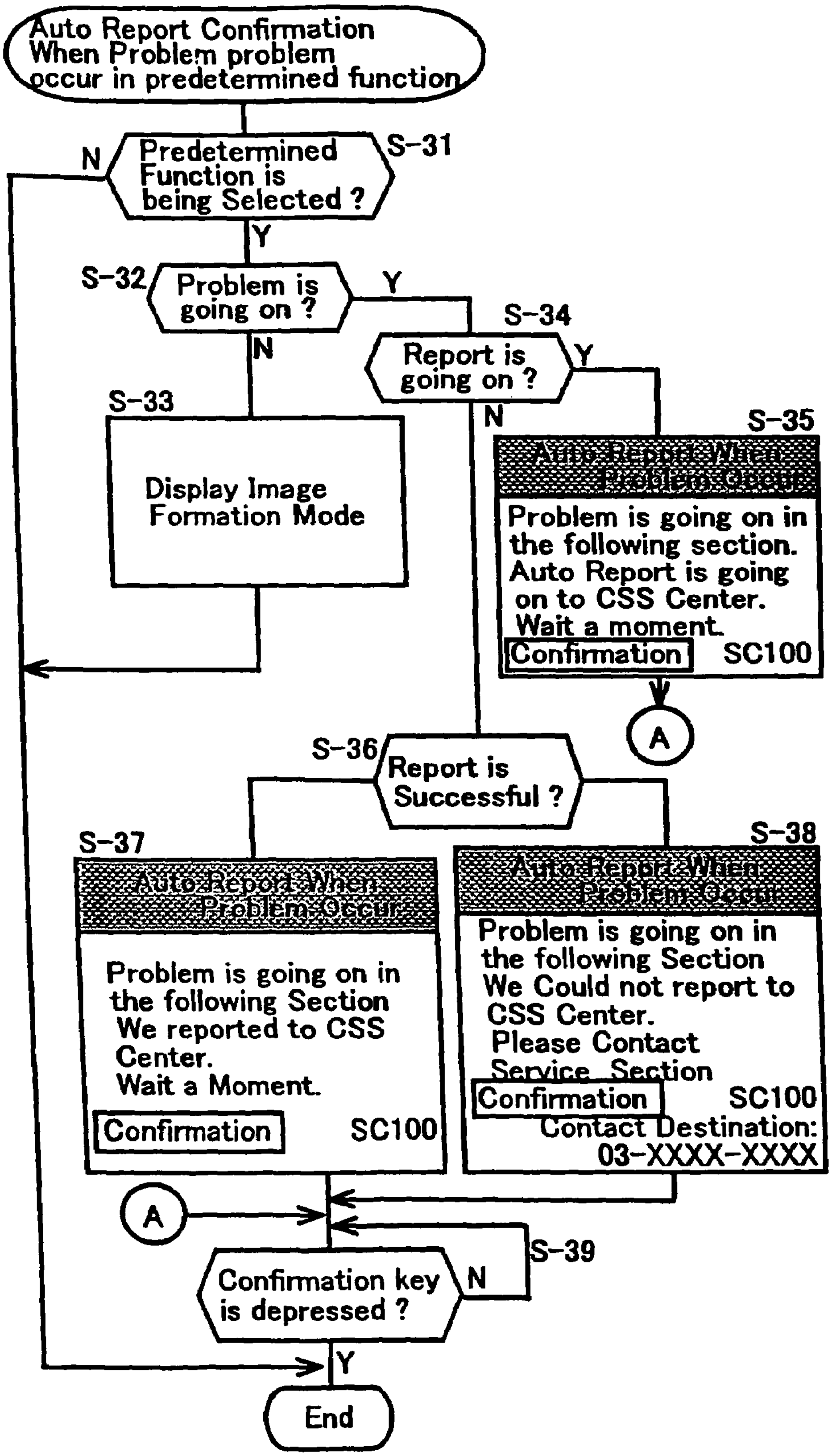
FIG. 17 is a flowchart illustrating a control of a display when a function presently used by a user develops a problem.

FIG. 17 is a flowchart illustrating one example of an auto report confirming operation when a problem occurs in a specified function in the image-forming apparatuses 1 through 5. As described above, if a problem occurs in the duplex tray and in cases as described in following items (a) and (b) the auto report is executed to the center system 6, the image-forming mode display is continuously displayed on the character display instrument 83 of the operation display section (Step S-22 through S-24):

(a) An image formation is executed in a simplex mode, and (b) An image formation is not executed, and a simplex mode is selected.

It is required to notify a customer of the occurrence of a problem through the operation displaying section after the operation is completed if the image formation described in the above item (a) is in the process and at a time when a duplex modeis selected in the case of above mentioned (b) (in step S-31). However, an auto report of the problem has been executed to the center system 6 at the time the problem occurred. Therefore, a result of the auto report is displayed on the character display instrument 83 of the operation display until a repair of the problem is completed as far as the duplex mode is selected from an aspect of providing an image-forming apparatus to be readily used by a customer.

As a result of the auto report, there exist following examples (a) through (c):

(a) A report in step S-35 proceeds (such messages are displayed when a duplex mode is selected shortly after a problem occurs).

(b) A report in step S-37 has been completed (such messages are displayed when a duplex mode is selected after receiving a response indicating successful of a report from the center system 6 via the communication line 8 and the data communication apparatus 7).

(c) Failure of a report in step S-38 (such messages are displayed when a duplex mode is selected after receiving a response indicating failure of a report from the data communication apparatus 8, or a time for receiving a response is over).

Of course, by completing the repair of the problem, Steps S-32 and S-33 are necessarily executed.

Further, in a case that an image formation is not executed when the problem occurs and the duplex mode is selected by operating the operation display section at the time, the problem occurrence is forwarded to the customer as noted above. However, the duplex mode can be cleared by depressing a confirmation key provided on the operation display section (step S-39). Since the duplex mode is cleared and the simplex mode comes again by clearing thereof, the problem occurrence display on the character display instrument 83 of the operation display section is changed into the image formation mode display, so that an image formation can be executed in the simplex mode.

Figure 18:
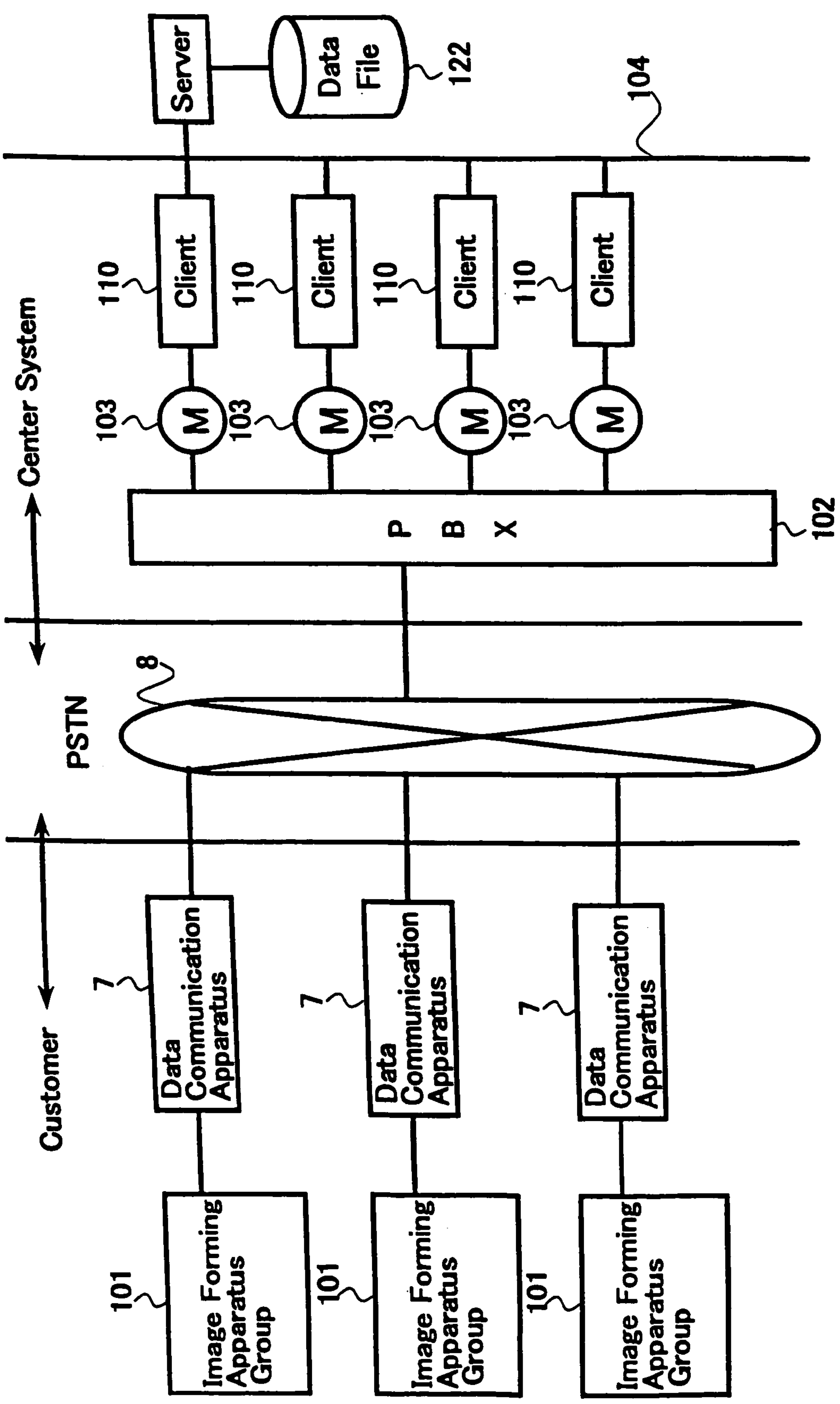
FIG. 18 is a block diagram illustrating a specific exemplary constitution of an image apparatus supervising system illustrated in FIG. 2.

FIG. 18 is a block diagram illustrating a specific exemplary constitution of an image-forming apparatus supervising system of one example of the present invention. In the image-forming apparatus supervising system, a yard switchboard (PBX) 102 disposed at the center system 6 side is connected to a plurality of image-forming apparatus group (a customer destination) 101 via a data communication apparatus 7 and a communication line (PSTN) 8, such as a public line network. Further, five units of an image-forming apparatus 1 through 5 are included in any one of image-forming apparatus groups 101.

The center system 6 is constituted by the yard switchboard 102, a plurality of MODEMs (M) 103, a plurality of clients (terminal apparatuses) 110, a server 120, and a LAN (Local Area Network) 104 or the like.

Each client 110 and the server 120 are connected by the LAN 104 with each other. When a report reason, such as a problem, occurs in any one of image-forming apparatuses of the plurality of image-forming apparatus group 101, information representing the effect (analog signal) is transmitted to the data communication apparatus 7. The information is entered by the inside MODEM into the yard switchboard 102 of the center system 6 via the communication line 8, is converted into a digital signal from the analog signal by any one of MODEMs 103 connecting with an extension thereof, and is finally entered into any one of clients 110. The yard switchboard 102 is set in a manner of a dial-in-system from the communication line 8 to the extension.

Figure 19:
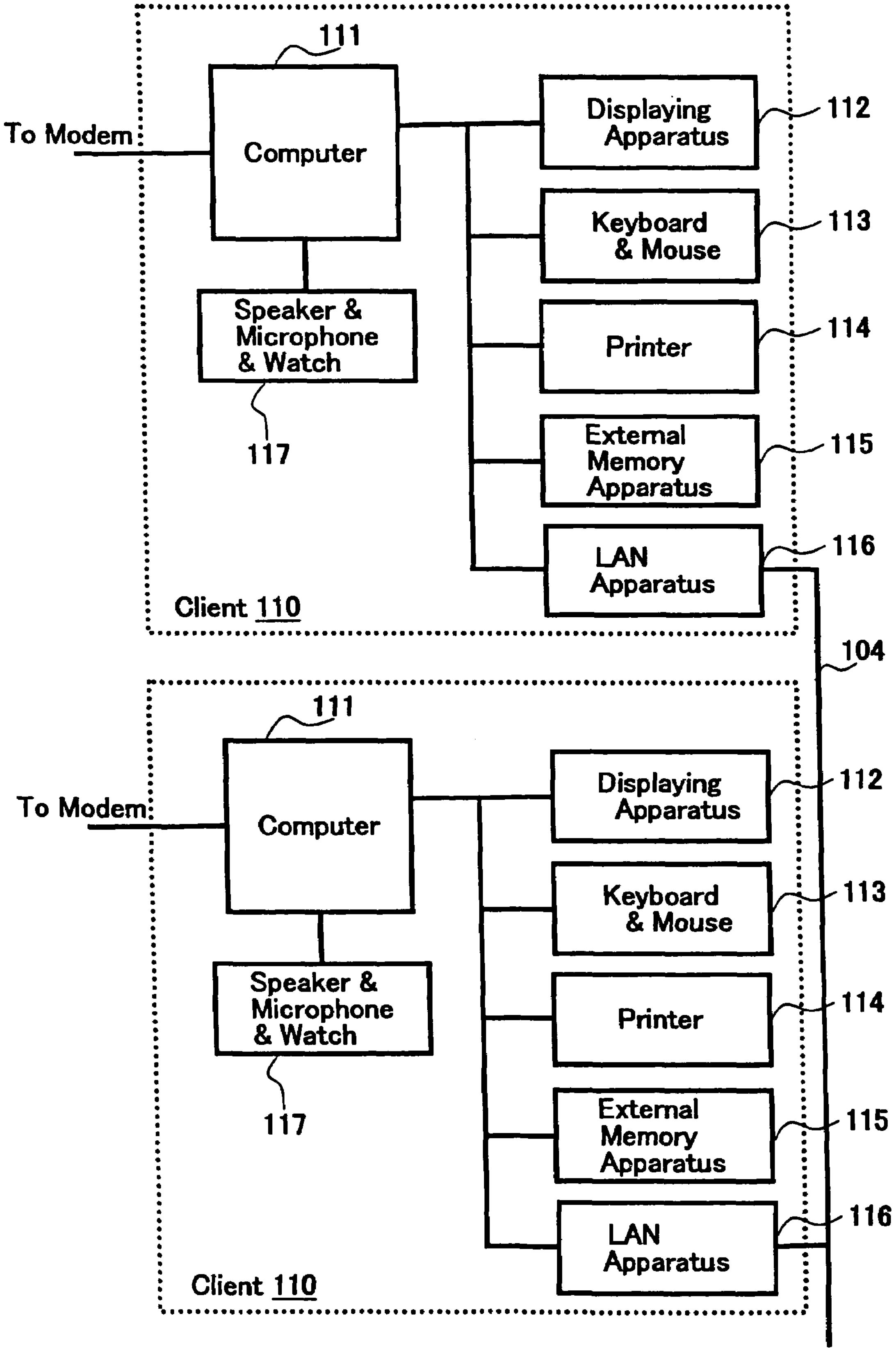
FIG. 19 is a block diagram illustrating a configuration of the client illustrated in FIG. 18.

FIG. 19 is a block diagram illustrating an exemplary constitution of each client 18. Each client 18 comprises a computer 111, a displaying apparatus 112, a keyboard & mouse 113, a printer 114, an external memory apparatus 115, a LAN apparatus 116, and a speaker-microphone-watch 117 or the like.

Figure 20:
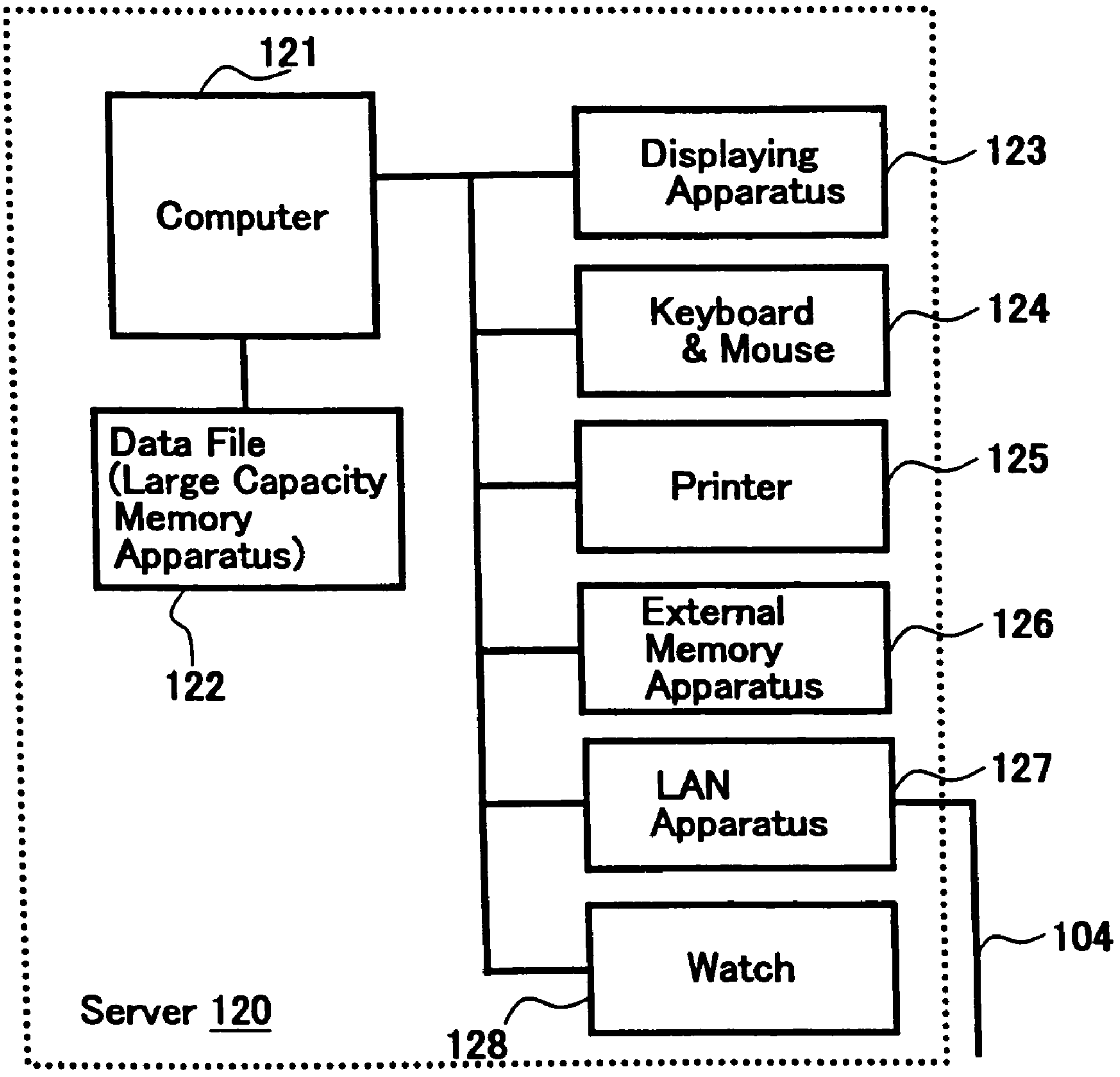
FIG. 20 is a block diagram illustrating a configuration of the server illustrated in FIG. 18.

FIG. 20 is a block diagram illustrating an exemplary constitution of a server 120. The server may comprise a computer 121, a data file having a large capacity memory apparatus 122, a display apparatus 123, a keyboard & mouse 124, a printer 125, an external memory apparatus 126, a LAN apparatus 127, and a watch 128 or the like. Databases as illustrated in FIGS. 21 through 24 may be stored in the data file 122.

Information for controlling an entire display and operations may be stored in the database illustrated in FIG. 21. The information may include customer information (address, telephone number, name of a person in charge or the like), service information (service assigned company name, telephone number, address, name of a person in charge, career of a machine or the like), log information (variety of interior information of a machine, variety of counter information) or the like.

A code SEQ illustrated in FIG. 21 may be a sequence number and is incremented (+1) every time information is received by the client 18. In this example, after being incremented to 99999, it may return to 00001. The customer name may be extracted from the customer information as illustrated in FIGS. 21–22 based on the machine and model information transmitted as a name of a customer of an information transmitting origin.

Variation of information may indicate different kinds of information transmitted from an image-forming apparatus to the client 18 and may include a SC (service person call), an AL (alarm), and a MC (manual call). A reception or receiving time as information obtained by the client using its watch function may be entered in a column of the reception time.

A time when the service person is arranged may be entered in a column of the arranging time. Information received about the problem may be entered in a column of the condition. A name (code) or the like of an operator having executed a reception may be entered in a column of the person in charge, thereby capable of determining whose operation.

Information representing a color to be used when displaying on the displaying apparatus of the client 18 may be entered in a column of the color information. Information indicating a time period having elapsed after a problem is received may be entered in a column of the elapsing time. Information related to a customer and required when an operation is executed may be entered in a column of the customer information. Information related to an applicable service company is entered in a column of the service information.

FIG. 22 illustrates a customer database which stores information indicating a kind of a machine, a contacting destination at a time of occurrence of a problem, or the like. The customer column illustrated in FIG. 22 may represent a customer name and indicate in whose office an image-forming apparatus is delivered. The telephone number and the facsimile number column adjacent to the customer name column may represent a contacting destination to be used when contacting the customer.

The address column may represent an address of a customer. The place column may represent a name of a section or department if it is of a major company. The person in charge column may represent a person in charge of an image-forming apparatus side and to be contacted. The delivery date column may represent a date when a machine (an image-forming apparatus) is delivered. A model number and a merchandise name of a delivered machine may be entered in the delivered machine column.

A model code and a number (a serial number) of a machine having been delivered may be entered in the machine number column. A name of a company executing a service of a customer's machine may be entered in the service company column. A telephone number of the service company may be entered in the telephone number column. A FAX number of a service company may be entered in the FAX number column. A characteristic of a customer may be entered in the others column. For example, information indicating a need of a prompt repair for a prescribed customer due to its higher emergency level, and reminder because of not being good relation may be entered therein.

FIG. 23 illustrates a database of machine information, and may store individual machine information. A model number and a merchandise name of a delivered machine may be entered in the delivery machine column. A model code and a machine number (a serial number) may be entered in the machine number column. The delivery date column indicates a delivery date of a machine. A name of an option attached to a machine (e.g., a sorter, and an auto document feeding section or the like) may be entered in the machine constitution column.

A column indicating contents of problems occurring so far may be entered in the problem career column. A listing of executed repairing operations and replaced parts or the like may be entered in the repair career column. Information transmitted from a machine (an image-forming apparatus) to a client 18 may be entered in the machine information as a career. Improvement and parts replacing information or the like may be entered in the design information.

FIG. 24 illustrates a detailed database of machine information. A model number and a merchandise name of a delivered machine may be entered in the delivery machine column. A model code and a machine number (i.e., a serial number) may be entered in the machine number column. A date (year, month, day, time, minute) when a client receives information from a machine may be entered in the information receiving date column. Information, such as a JAM (a paper jam), a SC (a machine abnormality), an alarm, a L call (a system abnormality), a MC (a manual call), and a SP (supply call) or the like may be entered in the information item column. Time information (generation time) illustrated in FIG. 24, namely, a day and time when the machine generates information, may be entered in the information generating date column. Each information code illustrated in FIG. 23 may be entered in the machine information column.

Figure 25:
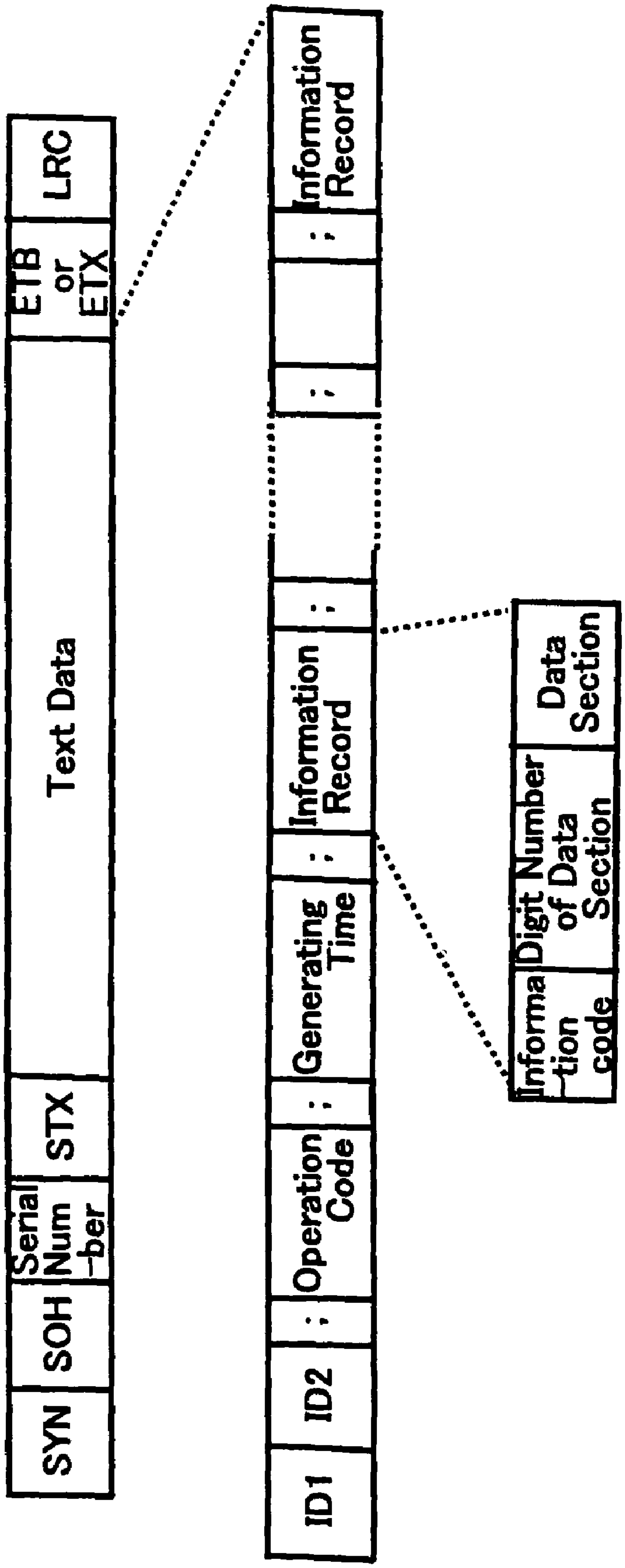
FIG. 25 is a chart illustrating another exemplary constitution of text data communicated between the center system and the data communication apparatus 7 illustrated in FIG. 1.

FIG. 25 illustrates another exemplary constitution of text data communicated between the center system 6 and the data communication apparatus 7. As illustrated in FIG. 25, an ID-1 may be constituted by adding a unique (a specified) number to the telephone number of the data communication apparatus 7 and has 20 digits. An ID-2 may be a model/machine number (17 digits) of an image-forming apparatus. Information to be transmitted such as for example information indicating a place where a JAM occurs in a case of occurrence of a JAM may be entered in the information record 1. Internal information of an image-forming apparatus such as for example a counter value of each of variety of sizes, a total counter value, a fixing temperature, a drum current, an option connecting information, and a version of a ROM or the like may be entered into the information record.

Hereinbelow, operations executed in the center system 6 are specifically described referring to FIGS. 26 through 37. A computer 111 of each client 18 of the center system 6 may execute the following operations from (1) to (11).

(1) It may temporary store information transmitted from a plurality of image-forming apparatus groups 101 (information automatically reported) into the external memory apparatus 115 if there is sufficient memory in the computer 111. It may, after that, analyze the information in the external memory apparatus 115, generate a database illustrated in FIGS. 21 through 24, and store the database in the data file 122 of the server 120. Namely, information transmitted from the image-forming apparatus group 101 is consecutively written in the database in the data file 122. Databases illustrated in FIGS. 21 through 24 may be linked with each other, and represent retrievable (read and write) information based on machine information and customer information.

When generation of these database are completed, it may display a common reception screen (i.e., an auto report information displaying screen) on the displaying apparatus 112 as illustrated in FIG. 26 based on the information in the database illustrated in FIG. 21. It may, at this moment, periodically (e.g., 1 minute) read each of a variety of information from the data file 122 in a unit of a client using a pipe function and may display over the reception 115 screen of the displaying apparatus 112.

An operator for each client 18 may then select from a variety of information displayed on the reception screen of the displaying apparatus 112 as an operation (such as making a reference to a user and arranging a service person) object using the keyboard and mouse 113.

The operator may after that make a reference to using a telephone and input operation completion information using the keyboard and mouse 113 when the image-forming apparatus of the user does not require a repair (e.g., a case that abnormality or the like has been resolved).

If the image-forming apparatus requires a repair, the operator may input information indicating that service has been arranged and actually execute an arrangement for the service person. The arranged service person may contact the operator of a corresponding client 18 using a telephone or the like at both a start of service to and an end of a repair of the image-forming apparatus, reporting each start and end status.

The operator having received the report of the start and end statuses of the operation from the service person may input information of either the operation start or the operation end by operating the inputting apparatus 113. Otherwise, the service person may have the image-forming apparatus automatically report either of the operation start or the operation end information to a corresponding client 18 by depressing an operation start key or an operation end key equipped with the image-forming apparatus.

(2) When the operator of a machine selects not-yet dealt information, a name of the operator (a name of a person in charge) having been registered at a time of initialization of the system and the effect that the operator has had on a process in operation (using characters telling about that effect) may be written in an applicable record in the data file 122. Thus, the record may be updated, and an operator executing the operation may be recognized.

(3) If not-yet-dealt information is selected by another client 18, since the name of the operator and the effect that the operation has had or has been stored in an applicable record in the data file 122, such information of the operator and a status of the effect will be displayed and added to the record when information is selected and read from the data file 122. Such information is displayed on the reception screen of the displaying apparatus 112 so as to be read through.

Figure 27:
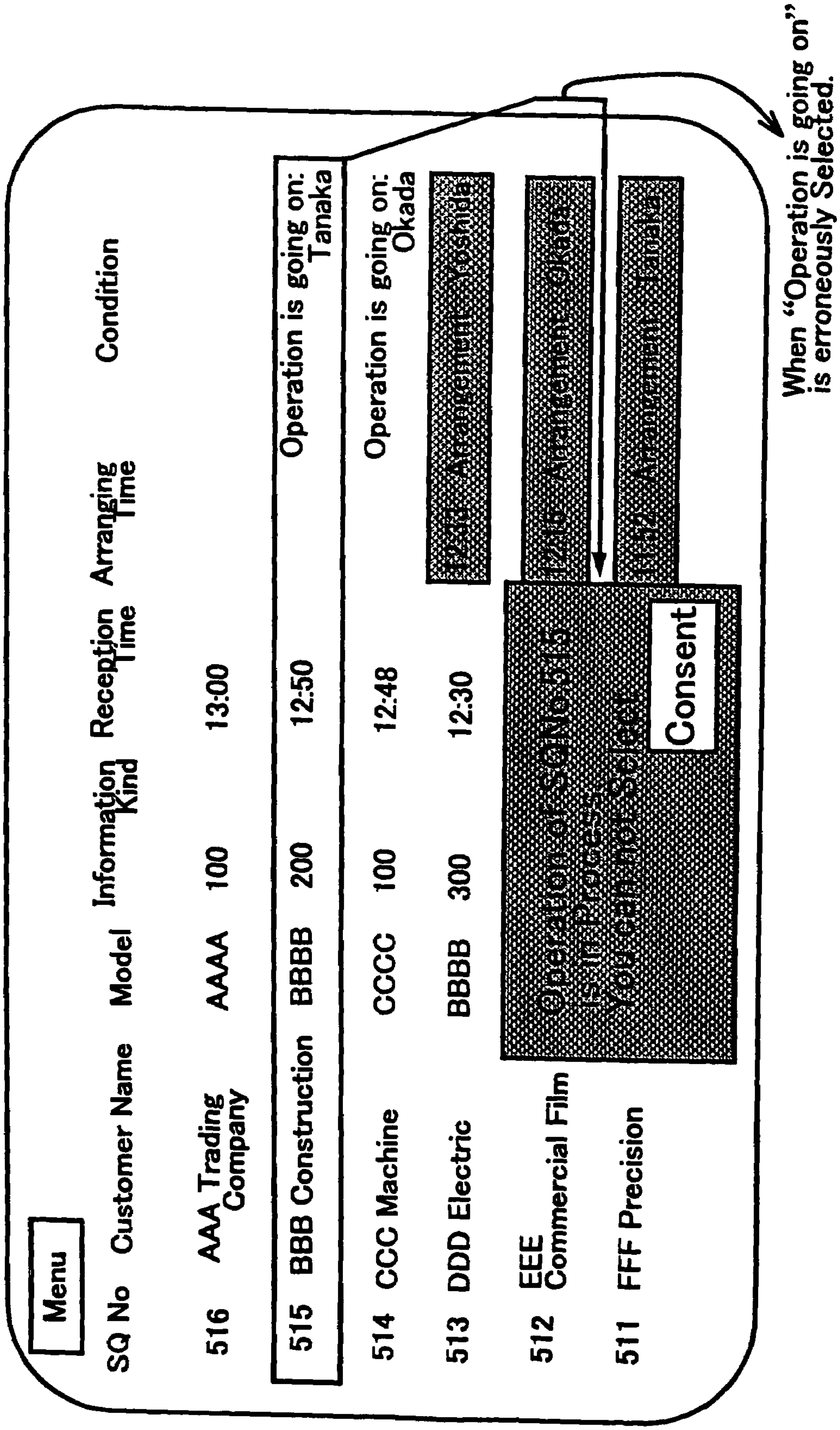
FIG. 27 is a block chart illustrating one example of a sub window or the like displayed when a menu illustrated in FIG. 26 is designated.

(4) When information has already been selected by the other client 18 and an operator of the own machine erroneously selects the information, the effect that the information has had or the process of being operated on by the other client 18 may be displayed on a window. For example, characters indicating "SQ No. 515 is in Process" are displayed as illustrated in FIG. 27. Messages telling that "it can not be selected" may be displayed using a sub window. The sub window can be closed by specifying a consent key. Further, it can be displayed using the sub window that selected information is in the process of being operated by Messieurs. X.

(5) When data representing that a service person schedule is completed, it is inputted against the information stored by the machine. An applicable record indicating message telling that "in the process of the operation" is overwritten with data indicating "in the process of the arrangement" (i.e., operator service has been arranged). At this moment, the time when the data indicating the message telling that "in the process of the arrangement of a service person" was overwritten is input to an arrangement time describing column of the applicable record of the data file 122.

(6) If data representing that a service person arrangement is completed and is inputted to another client 18, since data representing that the arrangement is stored in an applicable record in the data file 122, a display representing that the operation is in process may be replaced with a display representing that the arranged service is going on. A variety of information is thereafter read from the data file 122 and displayed on the displaying apparatus 112 so as to be read therethrough.

At this moment, a displaying color of a prescribed area (e.g., a customer name column) can be changed, referring to color information illustrated in FIG. 21. Further, if a service person arranging time is stored in the applicable record in the data file 122, the same is also read and displayed.

Figure 28:
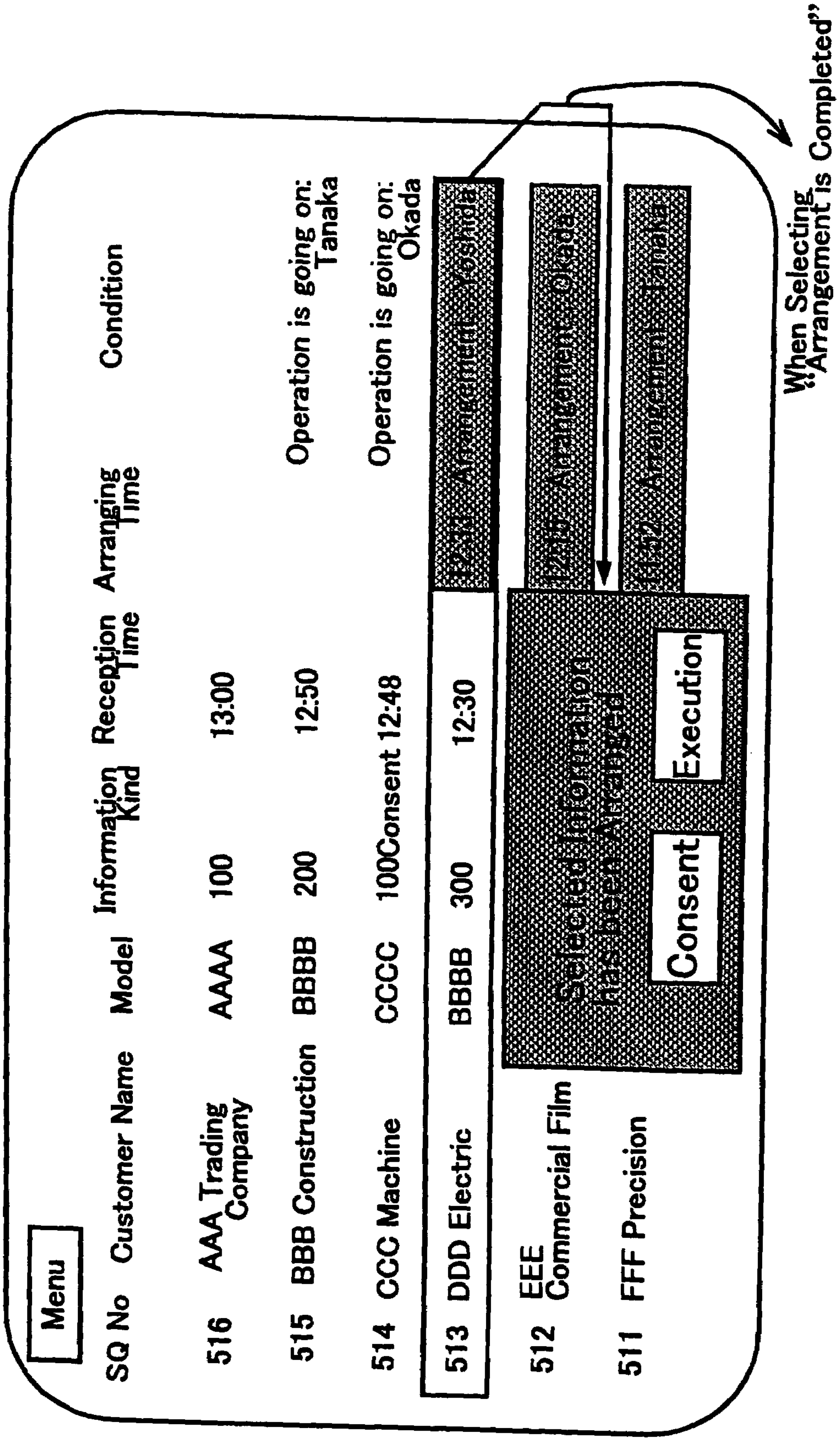
FIG. 28 is a block chart illustrating another example of the reception screen displayed on the displaying apparatus 112 illustrated in FIG. 4.

(7) If the own operator inputs information representing that a service person has been arranged against the information, against which the other client 18 has inputted data indicating that the service person has been arranged, such an effect is displayed that a service person has been arranged by the other client 18. For example, as illustrated in FIG. 28, messages telling that "selected information has been arranged" may be displayed using a sub window. The sub window can be closed by specifying a consent key. A detailed information screen (not shown) can be also displayed by specifying an execution key. Further, messages telling that arrangement against selected information has been completed can be displayed using the sub window.

Figure 29:
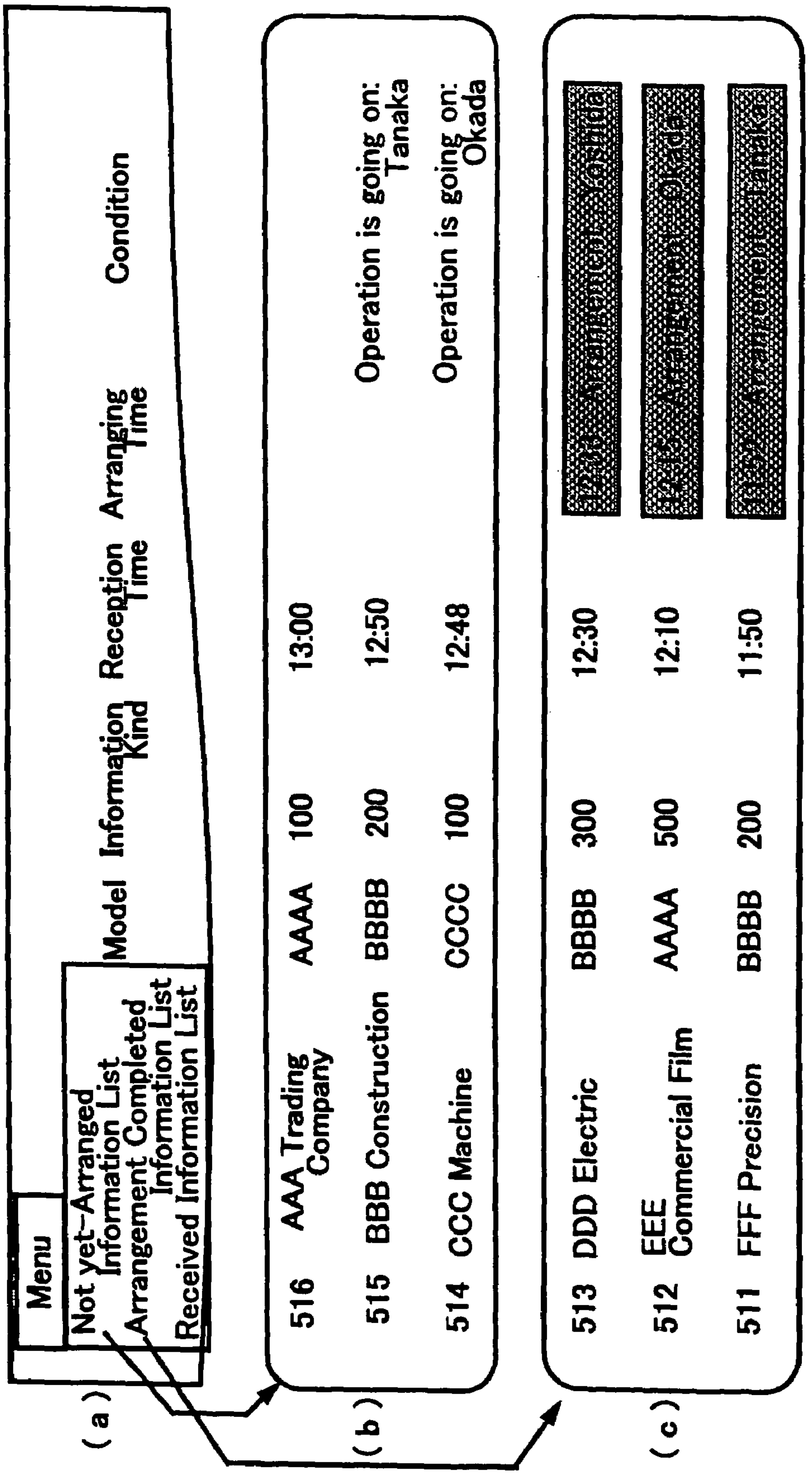

(8) When a menu illustrated in FIG. 26 is specified, a not-yet-arranged information list, an arrangement completed information list, and a received information list may be displayed using the sub window as illustrated in FIG. 29(*a*) as one example. Further, when the not-yet-arranged information list is specified, a displaying screen may be changed to a display list displaying only the not-yet-arranged information as illustrated in FIG. 27(*b*). In the case of specifying arrangement completed information list, a displaying screen may be changed to a display list displaying only the arrangement completed information as illustrated in FIG. 29(*c*).

(9) When an operator inputs information representing completion of an operation against information representing that "an operation is going on" displayed on the displaying screen or when an image-forming apparatus user reports information representing completion of an operation, the information having the messages is deleted.

(10) When an operator inputs information representing a start of an operation against information including messages telling that "an arrangement of a service person", or when an image-forming apparatus user reports information representing a start of an operation, the display indicating that the service person is arranged is changed into messages telling that "an operation is going on".

(11) When an operator inputs information representing completion of an operation against information including messages telling that "an operation is going on", or when an image-forming apparatus user reports information representing completion of an operation, the information having the messages is deleted.

Further, when a variety of information is displayed on the displaying apparatus 112 so as to be read through, it can be determined if a plurality of information reported from the same image forming apparatus are included by retrieving thereof using an apparatus number (a specified manufacturing number or the like). If a plurality of information exists, only one item such as for example leading information (i.e., receiving time oldest information) can be displayed, and the effect of the existence of the plurality of information can be displayed (for example, a displaying color of a specified area, such as a reception time column or the like, can be changed).

Figure 30:
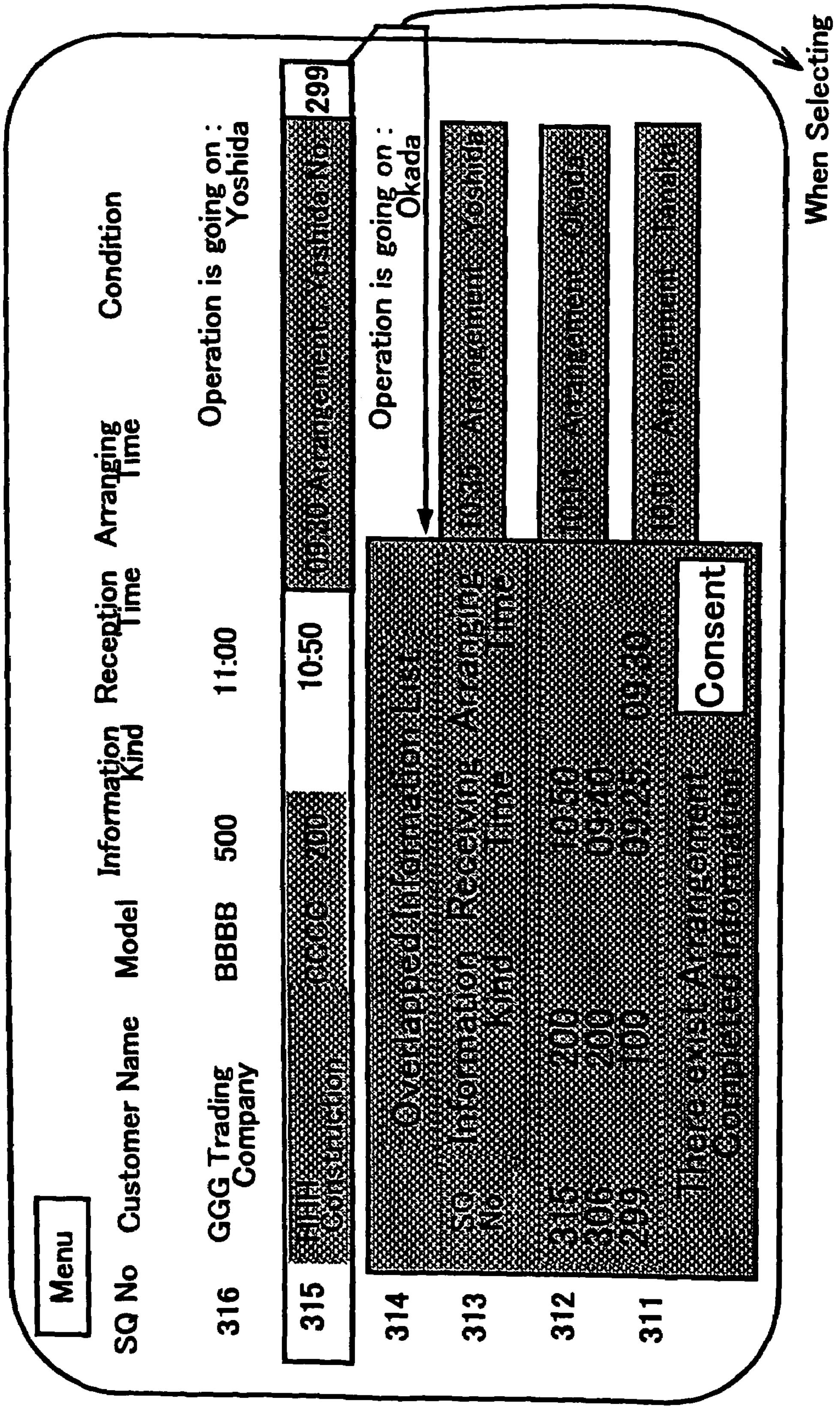

In this case, when an operator selects the information, information related to the same apparatus number is retrieved, and a plurality of retrieved information is displayed using a sub window (refer to FIG. 30). Further, instead of changing the displaying color, the specified area can blink. Further, color information (i.e., information representing a displaying color) illustrated in FIG. 21 may be changed with the elapsing of time. For example, it is preferable that yellow be displayed when an interval between reception and arrangement of information is more than one hour, a red when more than 2 hours are taken in the case. Otherwise, the color information may be changed corresponding to units of an operation, instead of changing with the above noted interval.

For example, an operational time period may be divided into a plurality of sections, such as a time period starting from reception until arrangement, that from arrangement until arrival of a service person at a customer site, and that from a start of an operation until completion thereof or the like, and further, a displaying color may be changed for each time period.

Further, necessary information can be retrieved and extracted from the database illustrated in FIGS. 21 through 24 using the above-noted machine number information and the customer information as a clue. Further, the extracted information may be processed and made into a graph. Further, the information can be extracted in a state of a format for use in a presentation or a report.

In addition, by installing a client 18 in a department or section, such as a QA department, a design department, a planning department or the like, who requires thereof, necessary information via a LAN 104 can be processed and extracted therefrom in each department or section. By giving the server 120 an accessing authority, it may possible to enable only a specified person to access.

Each data communication apparatus 7 (refer to FIG. 1) may function as a transmitting device as claimed in claim 1. Each client 110 (refer to FIG. 18) and a server 120 (refer to FIG. 18) may function as a apparatus list generating device, a first obtaining operation executing device, a confirming device, a not-yet-obtained list generating device, a second obtaining operating executing device, and an obtaining impossible list generating device.

Hereinbelow, an operation of the invention of the image-forming apparatus supervising system is specifically described referring to the drawings FIGS. 31–37. Each data communication apparatus 7 may execute a transmitting operation of a total counter value (other usage information can be possible) of each image-forming apparatus constituting an applicable image-forming apparatus group to the center system 6 via the communication line 8 in a format of text data as illustrated in FIG. 25. The transmitting operation may be executed when a self call is generated or when accessed from the center system 6 at a predetermined date and time (i.e., a predetermined time in a closing day). The above mentioned closing day may generally be any one of 5th, 10th, 15th, $20^{th}$, and end of month, and it depends on a customer (i.e., a data communication apparatus 7). Further, the center system side (see FIG. 18) may supervise each closing day.

FIG. 31 is a chart illustrating an outline and an exemplary constitution of the text data related to this invention, which is transmitted to the center system 6 from each data communication apparatus 7. Referring to FIG. 31, a counter value confirming code represents confirmation of a total counter value or a total counter value itself. A total number of copy sheets may have the same contents with the total counter value. In this example, N items of the total number of copy sheets are included in one text data because N items of memories for total counters exist in one unit of the image-forming apparatus.

Figure 32:
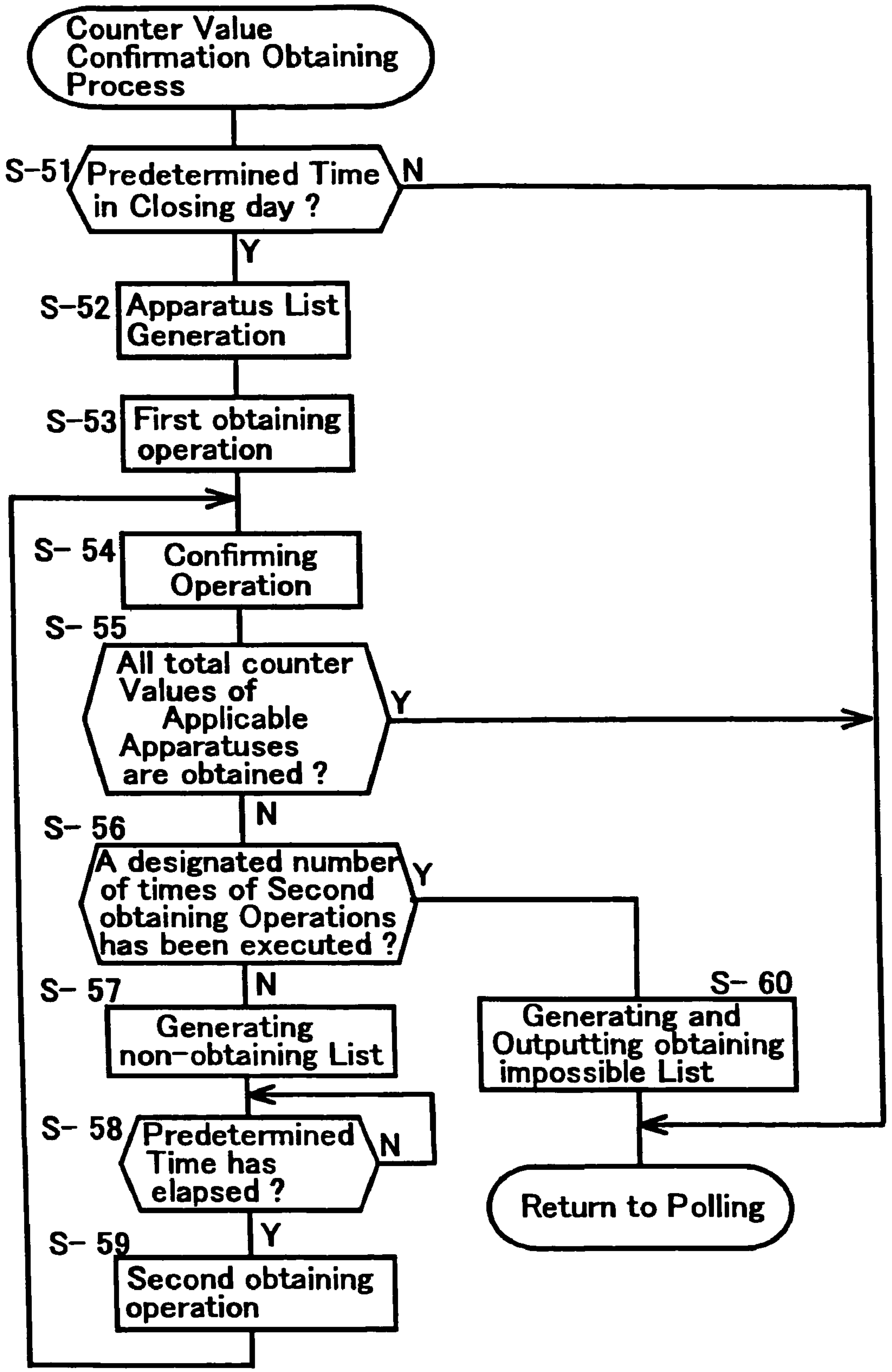
FIG. 32 is a flowchart illustrating one example of a total counter value confirming and obtaining operation in the center system 6 illustrated in FIG. 1 according to the present invention.

FIG. 32 is a flowchart illustrating one example of a total counter value obtaining operation with regard to the present invention executed in the center system 6. The center system 6 (precisely, a computer 111 of each client 18) has to obtain total counter values of all applicable image forming apparatuses during a closing day when obtaining the total counter value in a specified day (e.g., the 15th).

However, since a number of the applicable image-forming apparatuses is enormous, a busy signal on the line or the like may frequently occur. Thus, following operations are executed in view of the above. Namely, an operation illustrated in FIG. 32 may be periodically executed.

First, a current time and day may be compared with that of the closing day. If the current time and day corresponds to that of the closing day, a process goes to step S-52 and may generate an apparatus list (including a model/machine number identification information) indicating each image-forming apparatus (or data communication apparatus) having a total counter value (other usage information may be used) to be obtained in the closing day. The apparatus list may then be stored in the data file 122 of the server 120.

After that, the first obtaining operation for subsequently obtaining total counter values of applicable image-forming apparatuses, which is transmitted from each data communication apparatus 7 at a time of generation of self-call or an access to the data communication apparatus 7 (corresponding to the closing day of this time), may be executed in step S-53. A combination of the generation of a self-call and the access can be utilized.

In step S-54, the result of the first obtaining operation may be checked with the apparatus list stored in the data file 122, and one or more image-forming apparatuses or other data communication apparatuses having a not-yet-obtained total counter value are confirmed (i.e., determined).

At this moment, while obtaining each total counter value, an obtaining list indicating the effect of obtaining thereof, including identification information, such as a model/machine number of the image forming apparatus (or data communication apparatus) having the total counter value having been obtained, and a total counter value obtained time, may be generated.

Otherwise, the identification information of the image-forming apparatus (or data communication apparatus) whose total counter value have been obtained can be deleted from the apparatus list.

In a case of determining that the total counter values of applicable image-forming apparatuses are subsequently obtained from each data communication apparatus when the center system 6 accesses each data communication apparatus 7 at a specified time of the above-noted closing day and when each data communication apparatus does not actually receive a reading command (i.e., a collecting request) for obtaining a total counter value from the center system 6 in the specified time of the closing day, it is preferable for the data communication apparatus to determine that an abnormality occurred. It is also preferable for the data communication apparatus to generate after that a self-call to the center system 6 as a self-call generation destination whose information is stored therein and transmit a total counter value of the applicable image-forming apparatus. As a result, an obtaining ratio of a total counter value by the center system 6 may be increased.

Next, it is determined if all total counter values of the applicable image-forming apparatuses have been obtained based on the result of a confirmation operation executed in step S-55. If the all have been obtained, the operation may be completed. If the all have not been obtained (i.e., if an image-forming apparatus or data communication apparatus having a not yet obtained total counter value is confirmed), it is determined if the second obtaining operations have been executed a specified number of times in step S-56 as mentioned later in detail.

If the specified number of the second obtaining operations has not been completed, the obtained list may be checked with the apparatus list stored in the data file 122 in step S-57. Further, a not-yet-obtained list indicating image-forming apparatuses having a not-yet-obtained total counter value (including identification information and abnormal condition of image-forming apparatuses having a not-yet-obtained total counter value) may be generated and stored in the data file 122 of the server 120 in step S-57. Further, a predetermined time may elapse in step S-58 (i.e., a predetermined time of a next day or the like can be waited).

In step S-59, a data communication apparatus connected to an image-forming apparatus having a not-yet-obtained total counter value (or a data communication apparatus having a not yet obtained total counter value) may be accessed based on the not-yet-obtained list stored in the data file 122, and the not-yet-obtained total counter value may be transmitted from the data communication apparatus and is thereby obtained in a second obtaining operation. A process returns to step S-54, and in which the result of an operation may be checked with the not-yet-obtained list stored in the data file 122 (an apparatus list or an obtained list can be utilized for the not-yet-obtained list), and execute a confirming operation for confirming (i.e., determining) an image forming apparatus having a not-yet-obtained total counter value.

At this moment, while obtaining the total counter value, an obtained list indicating the effect thereof may be generated again (adding identification information such as for example a model/machine number and an obtaining time of a total counter value of an image forming apparatus or a data communication apparatus whose counter value is obtained this time to the first generated obtaining list). Otherwise, the identification information of the image-forming apparatus (or the data communication apparatus) whose counter value is obtained this time can be deleted.

After that, it is determined again if all total counter values of the applicable image-forming apparatuses have been obtained based on the result of the above-mentioned confirming operation in step S-55. If all total counter value have been obtained, the operation may be completed. If all counter values have been not yet obtained (an image-forming apparatus or a data communication apparatus having a not-yet-obtained total counter value is confirmed), it is determined if a predetermined times of the second obtaining operation is executed again in step S-56.

When the predetermined times of the second obtaining operation has not been completed, the obtained list may be checked with the apparatus list stored in the data file 122 in step S-57 and generate a not-yet-obtained list indicating one or more image-forming apparatuses data communication apparatuses having a not-yet-obtained total counter value. The not-yet-obtained list may be stored in this data file 122 of the server 120 in this step.

In step S-58, a predetermined time may be waited to elapse (a predetermined time of the next day or the like can be waited). In step S-59, a data communication apparatus connected to one or more image forming apparatuses having a not-yet-obtained total counter value or a data communication apparatus having a not-yet-obtained total counter value may be accessed based on the not-yet-obtained list stored in the data file 122, and the second obtaining operation for obtaining a not-yet-obtained total counter value transmitted from the data communication apparatus may be executed. A process then returns to step S-54, and the same operations and determinations mentioned above may be repeated until all total counter values of the applicable image-forming apparatuses are obtained.

However, when the second obtaining operation has been executed a predetermined number of times, but all the total counter values of the applicable image-forming apparatuses have not been obtained (one or more image-forming apparatuses or communication apparatuses having a not-yet-obtained total counter value is confirmed), a process goes to step S-60 depending on determination in step S-56.

In step S-60, the obtained list may be checked with the apparatus list stored in the data file 122, and an obtaining-impossible-list indicating one or more image-forming apparatuses or data communication apparatuses having an obtaining impossible total counter value may be generated. Information such as a model/machine number and abnormal condition of the image-forming apparatuses having an obtaining impossible total counter value may be generated.

The obtaining-impossible-list may be stored in the data file 122 of the server 120 and may be printed out by the printer 114. In the obtaining-impossible-list, abnormality information, which is detected when communication (i.e., the first and second obtaining operations) between the center system 6 and an applicable data communication apparatus or an image forming apparatus is executed, may be also included.

As abnormality information, the following contents (1) through (5) may be exemplified:

(1) A line is disconnected;

(2) A telephone number is changed (this may be recognized by detecting announcement from a communication network);

(3) An image-forming apparatus is moved;

(4) A connecting cable between a data communication apparatus and an image-forming apparatus is disconnected; and (5) Power source to an image-forming apparatus is turned off.

The printing out operation of the obtaining-impossible-list is preferably executed in a unit of a business office or a service company. If so, a center operator (i.e., an operator of each client 18 of the center system 6) can send contents of the obtaining-impossible-list to each applicable business office and service company by using a FAX, an online terminal apparatus, or an Internet system or the like, and thereby requesting that a sales or service person obtain the not-yet-obtained total counter value.

Figure 33:
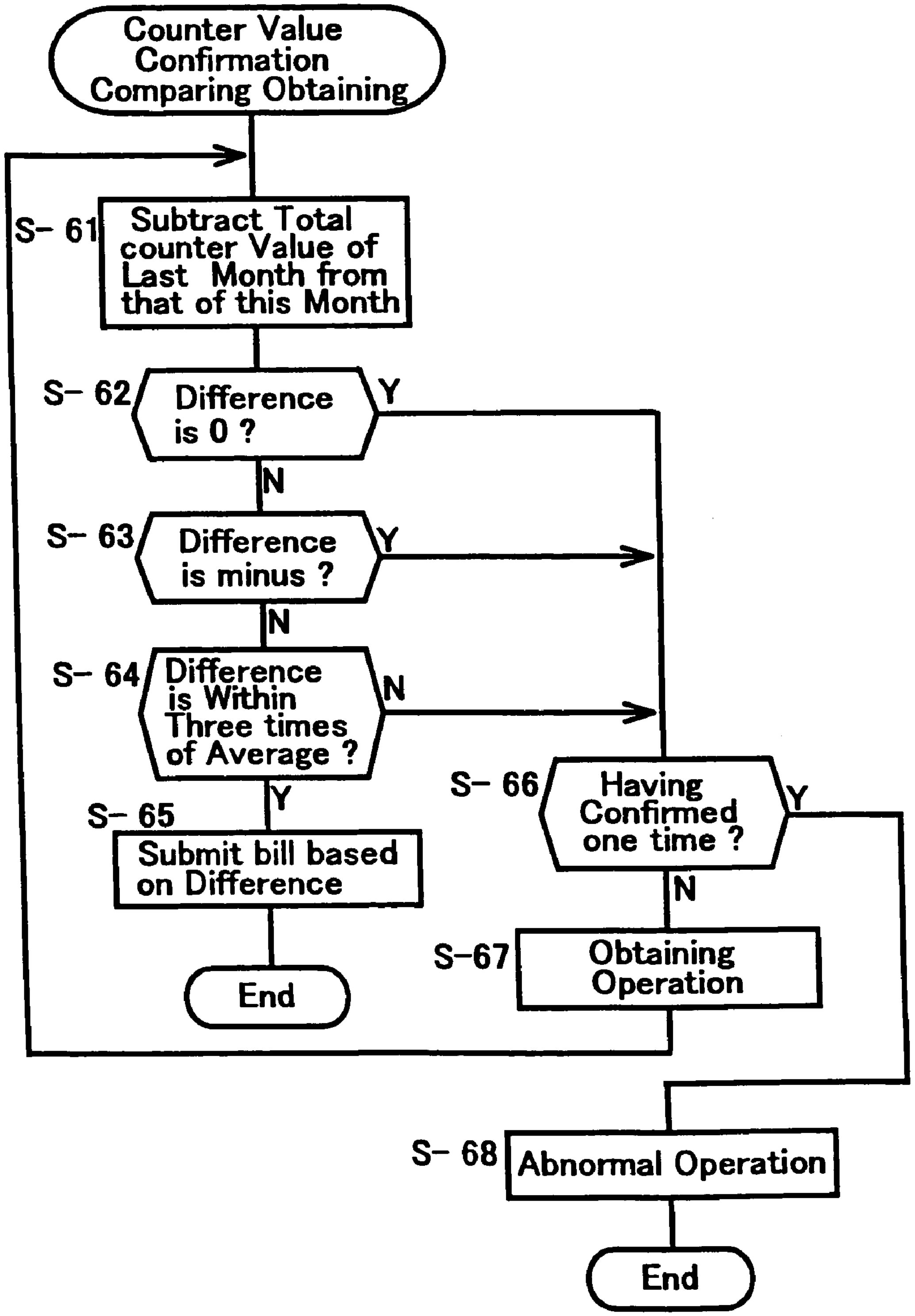
FIG. 33 is a flowchart illustrating one example of a total counter value confirming and comparing operation in the center system 6 illustrated in FIG. 1 according to the present invention.

FIG. 33 is a flowchart illustrating one example of a total counter value comparing operation of the present invention executed in the center system 6. A number of total counter values may be regarded as one in consideration of convenience of explanation. Accordingly, it should be understood that an operation illustrated in FIG. 33 may be executed a number of times corresponding to a number of total counter values obtained by executing operations as illustrated in FIG. 32. When having obtained all the total counter values of the applicable image-forming apparatuses from all applicable data communication apparatuses by the operation illustrated in FIG. 32, the center system 6 starts an operation illustrated FIG. 33.

Namely, it may initially compare total counter values (other usage information is possible) obtained on the closing day of this month and that of the last month, respectively, and calculate a difference (a number of used copy sheets) therebetween in step S-61.

Next, it may determine if the difference is zero, minus, or is within a range of a value calculated by multiplying an average of applicable each past total counter value by a specified coefficient (three times of the average in this example) in steps S-62 through S-64. If the difference is neither zero, or minus, but is within the range of a value calculated by multiplying the average of applicable each past total counter value by a specified coefficient (i.e., if it is determined as normal), a bill may be automatically issued by the printer 114 corresponding to the difference (in step S-65).

If the difference is zero or minus and is not within the range of the value calculated by multiplying the average of applicable each past total counter amount by the specified coefficient (i.e., if it is determined as abnormal), an applicable data communication apparatus may be accessed again, and an obtaining operation for obtaining a total counter value transmitted from the data communication apparatus may be executed (in steps S-66 and S-67). After that, a similar operation and confirmation mentioned above may be executed again (steps S-61 through S-64), and a following abnormal operation is executed corresponding to the difference calculated in step S-61, if it is further determined as abnormal (in steps S-66 and S-68).

Namely, a kind and largeness of abnormality may be determined based on the above mentioned difference, and an abnormal rank may then be determined based on the determination result, and finally an abnormality list, which includes the abnormal rank information determined and identification information, such as model/machine information, of an applicable image-forming apparatus or a data communication apparatus, may be generated.

The abnormal list may be stored in the data file 122 of the server 120, and contents thereof may be displayed on the displaying apparatus 112. The abnormal list can be printed using the printer 114. The contents of the list are sent to a center operator. Accordingly, when the operation illustrated in FIG. 32 is executed a number of times corresponding to that of obtaining of a total counter value, since a plurality of the above-noted abnormal operations are sometimes executed, contents of an abnormal list may be displayed on the displaying apparatus 112 such as the number of times.

In this case, higher ranked items of contents may be displayed earlier when a mode is selected. For example, contents of an abnormal list, which represents abnormality continuously occurring from the past, may be displayed earlier.

If adopting such an operation, the total counter value of each image-forming apparatus may be correctly handled. Further, a cause of abnormality can be recognized and an action can readily be taken. Further, when contents of the abnormality list are displayed and divided into a plurality of categories, such as for example items requiring an operation of a service person and those capable of being recovered by a customer by requesting the customer for recovery, a center operator can determine if he or she must immediately arrange a service person.

Further, it is preferable for the center system 6 to divide a plurality of abnormality information and to display on the displaying machine 112 or print out using the printer 114 the abnormalities of communication from the abnormalities of each machine. The center system separates abnormalities by comparing abnormalities of communication, an obtained total counter value, and a system.

In this example, the center system 6 executes the operation of FIG. 33 after having obtained all the total counter values of the applicable image-forming apparatuses from the applicable data communication apparatuses by executing the operation of FIG. 32. However, the operation of FIG. 33 can be executed, and, for example the obtained total counter value can be compared with the obtained total counter value of last month, every time each total counter value has been successfully obtained.

FIG. 34 is a chart illustrating one example of supervised (obtained) information, such as a number of total copy sheets of one unit of an image-forming apparatus (a copier, in this case), which is stored in the data file 122 of the server 120 of the center system 6. In FIG. 34, a model/machine number of No. 1 may indicate a model/machine number of a machine (a copier) installed in an office of a customer corresponding to information having such a model/machine number. Customer information and machine information can be readily extracted using the model/machine number as a clue, since it is linked with database illustrated in FIGS. 21 through 24.

No. 2 through No. 5 may represent a total number of copy sheets (a total counter value) of one unit of an image-forming apparatus respectively, which are obtained this time (i.e., a closing day of this month) by the center system 6. No. 6 through No. 9 may represent a total number of copy sheets of the image-forming apparatus, which was obtained last time (i.e., at the closing day of last month). Further, No. 10 through No. 13 may represent an average total number of copy sheets of the image forming apparatus, which has been obtained so far.

FIG. 35 is a chart illustrating one example of an all counter values confirming list (i.e., an apparatus list indicating all image-forming-apparatuses), and a counter value for the fifteenth confirming list (corresponding to an apparatus list capable of being generated in step S-52 of FIG. 32) respectively stored in the data file 122 of the server 120 of the center system 6.

FIG. 36 is a chart illustrating one example of a counter value confirmed and the obtained list for the fifteenth day (i.e., a closing day which corresponds to the above-noted obtained list) that was generated after a re-obtaining operation for the fifteenth day and stored in the data file 122 of the server 120 of the center system 6.

FIG. 37 is a chart illustrating one example of a counter value not yet obtained list (which corresponds to the not yet obtained list) for fifteenth day stored in the data file 122 of the server 120 of the center system 6.

When generating an obtaining-impossible-list after generating a list similar to that illustrated in FIG. 37, the center system 6 preferably extracts information such as for example an applicable customer name, an address, a service company performing a service of a machine of a customer from the database (refer to FIGS. 21 through 24) of the data file 122 of the server 120 based on each model/machine number and prints out with this information being added to the formerly generated list as an obtaining-impossible-list. Thereby, the center operator can send contents of the obtaining-impossible-list to each applicable service company using a FAX, an online terminal apparatus, and an Internet or the like.

Otherwise, even though an illustration is omitted in FIGS. 21 through 24, if a name of commercial office in which a sales person or a person in charge of each customer resides and if a telephone number or a Fax number for a person in charge is registered in the database, it is preferable to extract, based on each model/machine number, an applicable name of the commercial office, telephone number, Fax number, and person in charge from the database and print out this information with the formerly generated list as an obtaining-impossible-list, after generating a list similar to that illustrated in FIG. 37.

Thereby, the center operator can send contents of the obtaining-impossible-list to each applicable commercial office using a FAX, an online terminal apparatus, and an Internet or the like.

Numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. An image-forming apparatus supervising system supervising at least one image-forming apparatus which contains usage information and a central control apparatus connected via a communication line, said system configured to supervise said at least one image-forming apparatus via the communication line, said system comprising:

a usage information transmitting device configured to receive and transmit said usage information from said at least one image-forming apparatus to the central control apparatus, said usage information being related to usage career information of the image forming apparatus;

an apparatus list generating device configured to generate an apparatus list indicating the at least one image-forming apparatuses from which said usage information is to be obtained;

a first obtaining operation executing device configured to execute a first obtaining operation for obtaining said usage information from said at least one image-forming apparatus;

a confirming device configured to confirm which of the at least one image-forming apparatus maintains not-yet-obtained usage information after the first obtaining operation is executed by comparing the resulting of the first obtaining operation with the apparatus list;

a not-yet-obtained list generating device configured to generate a not-yet-obtained list indicating which of the at least one image-forming apparatus maintains said not-yet-obtained usage information based upon the confirmation; and a second obtaining operation executing device configure to execute a second obtaining operation for obtaining said usage information from the at least one image-forming apparatus by accessing the at least one image-forming apparatus based on image forming apparatuses listed on the not-yet-obtained list, which is generated based upon the confirmation, wherein said confirming device includes a not-yet-obtained usage information second confirming device configured to compare, after execution of the second obtaining operation, the list of image-forming apparatuses which transmitted with the not-yet-obtained list and confirm which data communication and image-forming apparatuses have said not-yet-obtained usage information, said not-yet-obtained usage information list generating device including a not-yet-obtained information list regenerating device configured to regenerate the not-yet-obtaining information list indicating which data communication and image-forming apparatuses have said not-yet-obtained usage information, wherein said second obtaining operation executing device executes another second obtaining operation after a predetermined time has elapsed if, after execution of the second obtaining operation, at least one data communication or image-forming apparatus with said not-yet-obtained usage information is confirmed, wherein said central control apparatus includes a usage information obtaining-impossible-list generating device configured to generate a usage information obtaining-impossible-list indicating that at least one data communication or image-forming apparatus has said not-yet-obtained usage information even though a predetermined number times of the second obtaining operations have been executed by the second obtaining operation executing device, wherein the central control apparatus transmits obtaining-impossible-list to at least one of a sales person and a service person in charge of the image-forming apparatus having said not-yet-obtained usage information, and wherein said usage information obtaining impossible list is outputted per sales branch or service company, said sales or service branch being in charge of the image forming apparatus still having the usage information specified by the obtaining impossible list.

2. An image-forming apparatus supervising system according to claim 1, further comprising:

a bill-submitting-device configured to submit a bill based on a difference in usage information obtained between a preceding and current number of image-formed sheets.

3. An image-forming apparatus supervising system according to claim 2, wherein said bill submitting device does not submit the bill if the difference is abnormal.

4. An image-forming apparatus supervising system according to claim 3, wherein said abnormal difference represents that the current number is prescribed times as much as an average value calculated by averaging total usage information of users.

5. An image-forming apparatus supervising system with a plurality of data communication apparatuses each connected with at least one image-forming apparatus which contains usage information and a central control apparatus connected with said plurality of data communication apparatus via a communication line, said system configured to supervise said at least one image-forming apparatus via the communication line and the plurality of data communication apparatus, said system comprising:

means for receiving and transmitting said usage information from said at least one image-forming apparatus to the central control apparatus, said means for receiving and transmitting included in the data communication apparatus and said usage information being related to usage career information of the image forming apparatus;

means for generating an apparatus list indicating the at least one image-forming apparatuses and plurality of data communication apparatuses from which usage information is to be obtained;

a first means for obtaining said usage information from said at least one image-forming apparatus and plurality of data communication apparatuses, said usage information transmitted through at least one of the plurality of data communication apparatuses;

means for confirming which of the plurality of data communication apparatuses and the at least one image-forming apparatus maintain not-yet-obtained usage information, confirmation occurs, after the first obtaining operation is executed by comparing the result of the first obtaining operation with the apparatus list;

means for generating a not-yet-obtained list indicating which of the plurality of data communication and the at least one image-forming apparatus maintain said not-yet-obtained usage information based upon the confirmation; and a second means for obtaining said usage information from the at least one image-forming apparatus and the plurality of data communication apparatuses by accessing the at least one image-forming apparatus and the plurality of data communication apparatuses based on image forming apparatuses listed on the not yet obtained list, which is generated based upon the confirmation, wherein said means for confirming includes means for generating a not-yet-obtained usage information list by comparing, after execution of the second obtaining operation, the list of image-forming apparatuses which transmitted with the not-yet-obtained list and confirming which data communication and image-forming apparatuses have said not-yet-obtained usage information, said means for generating a not-yet-obtained usage information list including a means for regenerating the not-yet-obtaining usage information list indicating which data communication and image-forming apparatuses have said not-yet-obtained usage information, and wherein said second means for obtaining said usage information executes another second obtaining operation after a predetermined time has elapsed if, after execution of the second obtaining operation, at least one data communication or image-forming apparatus with said not-yet-obtained usage information is confirmed, wherein said central control apparatus includes means for generating a usage information obtaining-impossible-list indicating that at least one data communication or image-forming apparatus has said not-yet-obtained usage information even though a predetermined number times of the second obtaining operations have been executed by the second means for obtaining usage information, wherein the central control apparatus transmits obtaining-impossible-list to at least one of a sales person and a service person in charge of the image-forming apparatus having said not-yet-obtained usage information, and wherein said usage information obtaining impossible list is outputted per sales branch or service company, said sales or service branch being in charge of the image forming apparatus still having the usage information specified by the obtaining impossible list.

6. An image-forming apparatus supervising system according to claim 5, further comprising:

means for billing based on a difference in usage information obtained between a preceding and current number of image-formed sheets.

7. An image-forming apparatus supervising system according to claim 6, wherein said means for billing does not submit the bill if the difference is abnormal.

8. An image-forming apparatus supervising system according to claim 7, wherein said abnormal difference represents that the current number is prescribed times as much as an average value calculated by averaging total usage information of users.

9. A method for supervising a system of image-forming apparatuses with at least one image-forming apparatus which contains usage information and a central control apparatus connected via a communication line, said system configured to supervise said at least one image-forming apparatus via the communication line, comprising the steps of:

receiving and transmitting said usage information from said at least one image-forming apparatus to the central control apparatus, said usage information being related to usage career information of the image forming apparatus;

generating an apparatus list indicating the at least one image-forming apparatuses from which said usage information is to be obtained;

obtaining said usage information from said at least one image-forming apparatus confirming which of the at least one image-forming apparatus maintains not-yet-obtained usage information after the first obtaining operation is executed by comparing the resulting of the first obtaining operation with the apparatus list;

generating a not-yet-obtained list indicating which of the at least one image-forming apparatus maintains said not-yet-obtained usage information based upon the confirmation; and re-obtaining said usage information from the at least one image-forming apparatus by accessing the at least one image-forming apparatus based on image forming apparatuses listed on the not yet obtained list, which is generated based upon the confirmation wherein said step of confirming further comprises the steps of:

generating a not-yet-obtained usage information list by comparing, after the re-obtaining step, the list of image-forming apparatuses which transmitted with the not-yet-obtained list and confirming which data communication and image-forming apparatuses have said not-yet-obtained usage information, said step of generating the not-yet-obtained usage information list including regenerating the not-yet-obtaining usage information list indicating which data communication and image-forming apparatuses have not-yet-obtained usage information, and wherein said step of re-obtaining said usage information occurs again after a predetermined time has elapsed if, after execution of the second obtaining operation, at least one data communication or image-forming apparatus with said not-yet-obtained usage information is confirmed, further comprising the steps of:

generating a usage information obtaining-impossible-list indicating that at least one data communication or image-forming apparatus has said not-yet-obtained usage information even though a predetermined number times of the second obtaining operations have been executed, sending said obtaining-impossible-list to at least one of a sales person and a service person in charge of the image-forming apparatus having said not-yet-obtained usage information, and outputting said usage information obtaining impossible list per sales branch or service company, said sales or service branch being in charge of the image forming apparatus still having the usage information specified by the obtaining impossible list.

10. A method according to claim 9, further comprising the step of:

billing based on a difference in usage information obtained between a preceding and current number of image-formed sheets.

11. A method according to claim 10, wherein said step of billing does not submit the bill if the difference is abnormal.

12. A method according to claim 11, wherein said step of billing does not submit the bill if the abnormal difference represents that the current number is prescribed times as much as an average value calculated by averaging total usage information of users.

13. The image forming apparatus supervising system according to claim 1, wherein said usage information obtaining impossible list is provided with one of a name of the sales branch, a name of a person of the sales branch in charge, and a telephone number of the sales branch, in charge of the image forming apparatus.

14. The image forming apparatus supervising system according to claim 1, wherein the central control apparatus includes contact information used in contacting each of said image forming apparatus, said contact information including one of names of a service company, a sales branch, and a person in charge, and a contact destination.

* * * * *